US007228155B2

(12) United States Patent　　(10) Patent No.: US 7,228,155 B2
Saunders　　(45) Date of Patent: Jun. 5, 2007

(54) SYSTEM AND METHOD FOR REMOTELY INITIALIZING A RF TRANSACTION

(75) Inventor: Peter D. Saunders, Salt Lake City, UT (US)

(73) Assignee: American Express Travel Related Services Company, Inc., New York, NY (US)

( * ) Notice: Subject to any disclaimer, the term of this patent is extended or adjusted under 35 U.S.C. 154(b) by 41 days.

(21) Appl. No.: 10/711,970

(22) Filed: Oct. 15, 2004

(65) Prior Publication Data

US 2006/0074813 A1 Apr. 6, 2006

Related U.S. Application Data

(63) Continuation-in-part of application No. 10/746,781, filed on Dec. 24, 2003, and a continuation-in-part of application No. 10/340,352, filed on Jan. 10, 2003, and a continuation-in-part of application No. 10/192,488, filed on Jul. 9, 2002.

(60) Provisional application No. 60/512,297, filed on Oct. 17, 2003, provisional application No. 60/396,577, filed on Jul. 16, 2002, provisional application No. 60/304,216, filed on Jul. 10, 2001.

(51) Int. Cl.
*H04B 1/38* (2006.01)
(52) U.S. Cl. ............... 455/558; 455/411; 455/418; 379/114.19; 379/114.21; 713/173
(58) Field of Classification Search ............... 455/558, 455/411, 418; 379/114.19, 114.21; 713/173
See application file for complete search history.

(56) References Cited

U.S. PATENT DOCUMENTS 4,303,904 A 12/1981 Chasek 4,475,308 A 10/1984 Heise et al.

(Continued)

FOREIGN PATENT DOCUMENTS

CH 689070 1/1998

(Continued)

OTHER PUBLICATIONS

"What's New: Timex Watch Features Speedpass System", http://www.speedpass.com/news/article.jsp?id=51 (1 page).

(Continued)

*Primary Examiner*—Danh Le
(74) *Attorney, Agent, or Firm*—Fitzpatrick, Cella, Harper & Scinto

(57) ABSTRACT

The present invention relates to a process for providing a RF module configured to convert a nontraditional transaction device for traditional transaction completion. The RF module is placed in physical and logical communication with a microprocessor of a nontraditional transaction device for receiving a personalization file to enable the RF module to complete RF transactions. In an exemplary embodiment, the microprocessor is configured to receive the personalization file from a mobile device account provider subsequent to an end user establishing communication with the device account provider and notifying the provider that a RF module is to be personalized. The mobile device account provider may receive the personalization file from a RF module account issuer and provide the personalization file to the RF module via the mobile device microprocessor. In another exemplary embodiment, the mobile device may include a USB interface for use in providing the personalization file to the RF module by establishing communications between the USB interface and the mobile device account provider or the RF module account provider as required.

13 Claims, 24 Drawing Sheets

U.S. PATENT DOCUMENTS

| | | |
|---|---|---|
| 4,583,766 A | 4/1986 | Wessel |
| 4,639,765 A | 1/1987 | dHont |
| 4,672,021 A | 6/1987 | Blumel et al. |
| 4,739,328 A | 4/1988 | Koelle et al. |
| 4,961,142 A | 10/1990 | Elliott et al. |
| 5,023,782 A | 6/1991 | Lutz et al. |
| 5,053,774 A | 10/1991 | Schuermann et al. |
| 5,099,226 A | 3/1992 | Andrews |
| 5,101,200 A | 3/1992 | Swett |
| 5,197,140 A | 3/1993 | Balmer |
| 5,212,777 A | 5/1993 | Gove et al. |
| 5,221,838 A | 6/1993 | Gutman et al. |
| 5,222,282 A | 6/1993 | Sukonnik et al. |
| 5,226,989 A | 7/1993 | Sukonnik |
| 5,239,654 A | 8/1993 | IngSimmons et al. |
| 5,247,304 A | 9/1993 | dHont |
| 5,274,392 A | 12/1993 | dHont et al. |
| 5,285,100 A | 2/1994 | Byatt |
| 5,305,002 A | 4/1994 | Holodak et al. |
| 5,329,617 A | 7/1994 | Asal |
| 5,331,138 A | 7/1994 | Saroya |
| 5,339,447 A | 8/1994 | Balmer |
| 5,349,357 A | 9/1994 | Schurmann et al. |
| 5,351,052 A | 9/1994 | dHont et al. |
| 5,371,896 A | 12/1994 | Gove et al. |
| 5,373,303 A | 12/1994 | dHont |
| 5,407,893 A | 4/1995 | Koshizuka et al. |
| 5,408,243 A | 4/1995 | dHont |
| 5,410,649 A | 4/1995 | Gove |
| 5,428,363 A | 6/1995 | dHont |
| 5,453,747 A | 9/1995 | dHont et al. |
| 5,471,592 A | 11/1995 | Gove et al. |
| 5,485,510 A | 1/1996 | Colbert |
| 5,488,376 A | 1/1996 | Hurta et al. |
| 5,489,411 A | 2/1996 | Jha et al. |
| 5,489,908 A | 2/1996 | Orthmann et al. |
| 5,490,079 A | 2/1996 | Sharpe et al. |
| 5,491,483 A | 2/1996 | dHont |
| 5,491,484 A | 2/1996 | Schuermann |
| 5,491,715 A | 2/1996 | Flaxl |
| 5,493,312 A | 2/1996 | Knebelkamp |
| 5,497,121 A | 3/1996 | dHont |
| 5,500,651 A | 3/1996 | Schuermann |
| 5,513,525 A | 5/1996 | Schurmann |
| 5,519,381 A | 5/1996 | Marsh et al. |
| 5,522,083 A | 5/1996 | Gove et al. |
| 5,525,992 A | 6/1996 | Froschermeier |
| 5,525,994 A | 6/1996 | Hurta et al. |
| 5,530,232 A | 6/1996 | Taylor |
| 5,541,604 A | 7/1996 | Meier |
| 5,543,798 A | 8/1996 | Schuermann |
| 5,544,246 A | 8/1996 | Mandelbaum et al. |
| 5,548,291 A | 8/1996 | Meier et al. |
| 5,550,536 A | 8/1996 | Flaxl |
| 5,550,548 A | 8/1996 | Schuermann |
| 5,552,789 A | 9/1996 | Schuermann |
| 5,557,279 A | 9/1996 | dHont |
| 5,557,516 A | 9/1996 | Hogan |
| 5,561,430 A | 10/1996 | Knebelkamp |
| 5,563,582 A | 10/1996 | dHont |
| 5,569,187 A | 10/1996 | Kaiser |
| 5,572,226 A | 11/1996 | Tuttle |
| 5,577,109 A | 11/1996 | Stimson et al. |
| 5,581,630 A | 12/1996 | Bonneau, Jr. |
| 5,592,150 A | 1/1997 | dHont |
| 5,592,405 A | 1/1997 | Gove et al. |
| 5,594,233 A | 1/1997 | Kenneth et al. |
| 5,594,448 A | 1/1997 | dHont |
| 5,597,534 A | 1/1997 | Kaiser |
| 5,600,175 A | 2/1997 | Orthmann |
| 5,602,538 A | 2/1997 | Orthmann et al. |
| 5,602,919 A | 2/1997 | Hurta et al. |
| 5,604,342 A | 2/1997 | Fujioka |
| 5,606,520 A | 2/1997 | Gove et al. |
| 5,606,594 A | 2/1997 | Register et al. |
| 5,607,522 A | 3/1997 | McDonnell |
| 5,608,406 A | 3/1997 | Eberth et al. |
| 5,608,778 A | 3/1997 | Partridge, III |
| 5,613,146 A | 3/1997 | Gove et al. |
| 5,619,207 A | 4/1997 | dHont |
| 5,621,396 A | 4/1997 | Flaxl |
| 5,621,411 A | 4/1997 | Hagl et al. |
| 5,621,412 A | 4/1997 | Sharpe et al. |
| 5,625,366 A | 4/1997 | dHont |
| 5,625,370 A | 4/1997 | dHont |
| 5,625,695 A | 4/1997 | MRaihi et al. |
| 5,629,981 A | 5/1997 | Nerlikar |
| 5,638,080 A | 6/1997 | Orthmann et al. |
| 5,640,002 A | 6/1997 | Ruppert et al. |
| 5,646,607 A | 7/1997 | Schurmann et al. |
| 5,657,388 A | 8/1997 | Weiss |
| 5,660,319 A | 8/1997 | Falcone et al. |
| 5,673,106 A | 9/1997 | Thompson |
| 5,675,342 A | 10/1997 | Sharpe |
| 5,686,920 A | 11/1997 | Hurta et al. |
| 5,691,731 A | 11/1997 | vanErven |
| 5,692,132 A | 11/1997 | Hogan |
| 5,696,913 A | 12/1997 | Gove et al. |
| 5,698,837 A | 12/1997 | Furuta |
| 5,699,528 A | 12/1997 | Hogan |
| 5,701,127 A | 12/1997 | Sharpe |
| 5,704,046 A | 12/1997 | Hogan |
| 5,705,798 A | 1/1998 | Tarbox |
| 5,721,781 A | 2/1998 | Deo et al. |
| 5,729,053 A | 3/1998 | Orthmann |
| 5,729,236 A | 3/1998 | Flaxl |
| 5,731,957 A | 3/1998 | Brennan |
| 5,732,579 A | 3/1998 | dHont et al. |
| 5,748,137 A | 5/1998 | dHont |
| 5,748,737 A | 5/1998 | Daggar |
| 5,758,195 A | 5/1998 | Balmer |
| 5,761,306 A | 6/1998 | Lewis |
| 5,761,493 A | 6/1998 | Blakeley et al. |
| 5,768,609 A | 6/1998 | Gove et al. |
| 5,774,882 A | 6/1998 | Keen et al. |
| 5,777,903 A | 7/1998 | Piosenka |
| 5,778,067 A | 7/1998 | Jones et al. |
| 5,785,680 A | 7/1998 | Niezink et al. |
| 5,792,337 A | 8/1998 | Padovani et al. |
| 5,793,324 A | 8/1998 | Aslanidis et al. |
| 5,794,095 A | 8/1998 | Thompson |
| 5,797,060 A | 8/1998 | Thompson |
| 5,797,085 A | 8/1998 | Buek et al. |
| 5,797,133 A | 8/1998 | Jones et al. |
| 5,798,709 A | 8/1998 | Flaxl |
| 5,809,142 A | 9/1998 | Hurta et al. |
| 5,809,288 A | 9/1998 | Balmer |
| 5,809,633 A | 9/1998 | Mundigl et al. |
| 5,825,007 A | 10/1998 | Jesadanont |
| 5,825,302 A | 10/1998 | Stafford |
| 5,826,077 A | 10/1998 | Blakeley et al. |
| 5,828,044 A | 10/1998 | Jun et al. |
| 5,834,756 A | 11/1998 | Gutman et al. |
| 5,841,364 A | 11/1998 | Hagl et al. |
| 5,842,088 A | 11/1998 | Thompson |
| 5,844,218 A | 12/1998 | Kawan et al. |
| 5,844,230 A | 12/1998 | Lalonde |
| 5,845,267 A | 12/1998 | Ronen |
| 5,851,149 A | 12/1998 | Xidos et al. |
| 5,854,891 A | 12/1998 | Postlewaite et al. |
| 5,858,006 A | 1/1999 | Van der AA et al. |
| 5,859,779 A | 1/1999 | Giordano et al. |
| 5,864,323 A | 1/1999 | Berthon |
| 5,867,100 A | 2/1999 | dHont |

| | | | | | |
|---|---|---|---|---|---|
| 5,870,031 A | 2/1999 | Kaiser et al. | 6,177,860 B1 | 1/2001 | Cromer et al. |
| 5,870,915 A | 2/1999 | dHont | 6,179,205 B1 | 1/2001 | Sloan |
| 5,878,215 A | 3/1999 | Kling et al. | 6,179,206 B1 | 1/2001 | Matsumori |
| 5,878,403 A | 3/1999 | DeFrancesco et al. | 6,188,994 B1 | 2/2001 | Egendorf |
| 5,880,675 A | 3/1999 | Trautner | 6,192,255 B1 | 2/2001 | Lewis et al. |
| 5,881,272 A | 3/1999 | Balmer | 6,198,728 B1 | 3/2001 | Hulyalkar et al. |
| 5,887,266 A | 3/1999 | Heinonen et al. | 6,198,875 B1 | 3/2001 | Edenson et al. |
| 5,890,137 A | 3/1999 | Koreeda | 6,202,927 B1 | 3/2001 | Bashan et al. |
| 5,898,783 A | 4/1999 | Rohrbach | 6,205,151 B1 | 3/2001 | Quay et al. |
| 5,903,830 A | 5/1999 | Joao et al. | 6,206,293 B1 | 3/2001 | Gutman et al. |
| 5,905,798 A | 5/1999 | Nerlikar et al. | 6,215,437 B1 | 4/2001 | Schurmann et al. |
| 5,912,678 A | 6/1999 | Saxena et al. | 6,216,219 B1 | 4/2001 | Cai et al. |
| 5,920,628 A | 7/1999 | Indeck et al. | 6,219,439 B1 | 4/2001 | Burger |
| 5,929,801 A | 7/1999 | Aslanidis et al. | D442,627 S | 5/2001 | Webb et al. |
| 5,931,917 A | 8/1999 | Nguyen et al. | D442,629 S | 5/2001 | Webb et al. |
| 5,933,624 A | 8/1999 | Balmer | 6,223,984 B1 | 5/2001 | Renner et al. |
| 5,943,624 A | 8/1999 | Fox et al. | 6,226,382 B1 | 5/2001 | MRaihi et al. |
| 5,948,116 A | 9/1999 | Aslanidis et al. | 6,230,270 B1 | 5/2001 | Laczko, Sr. |
| 5,953,512 A | 9/1999 | Cai et al. | 6,232,917 B1 | 5/2001 | Baumer et al. |
| 5,955,717 A | 9/1999 | Vanstone | 6,233,683 B1 | 5/2001 | Chan et al. |
| 5,955,969 A | 9/1999 | dHont | 6,237,848 B1 | 5/2001 | Everett |
| 5,956,024 A | 9/1999 | Strickland et al. | 6,239,675 B1 | 5/2001 | Flaxl |
| 5,963,924 A | 10/1999 | Williams et al. | 6,240,187 B1 | 5/2001 | Lewis |
| 5,970,148 A | 10/1999 | Meier | 6,257,486 B1 | 7/2001 | Teicher et al. |
| RE36,365 E | 11/1999 | Levine et al. | 6,259,769 B1 | 7/2001 | Page |
| 5,978,840 A | 11/1999 | Nguyen et al. | 6,260,026 B1 | 7/2001 | Tomida et al. |
| 5,983,208 A | 11/1999 | Haller | 6,260,088 B1 | 7/2001 | Gove et al. |
| 5,987,140 A | 11/1999 | Rowney et al. | 6,264,106 B1 | 7/2001 | Bridgelall |
| 5,987,155 A | 11/1999 | Dunn et al. | 6,266,754 B1 | 7/2001 | Laczko, Sr. et al. |
| 5,987,498 A | 11/1999 | Athing et al. | 6,273,335 B1 | 8/2001 | Sloan |
| 5,989,950 A | 11/1999 | Wu | 6,282,522 B1 | 8/2001 | Davis et al. |
| 5,991,608 A | 11/1999 | Leyten | D447,515 S | 9/2001 | Faenza, Jr. et al. |
| 5,991,750 A | 11/1999 | Watson | 6,286,763 B1 | 9/2001 | Reynolds et al. |
| 5,996,076 A | 11/1999 | Rowney et al. | 6,289,324 B1 | 9/2001 | Kawan |
| 6,002,438 A | 12/1999 | Hocevar et al. | 6,315,193 B1 | 11/2001 | Hogan |
| 6,002,767 A | 12/1999 | Kramer | 6,317,721 B1 | 11/2001 | Hurta et al. |
| 6,003,014 A | 12/1999 | Lee et al. | 6,318,636 B1 | 11/2001 | Reynolds et al. |
| 6,005,942 A | 12/1999 | Chan et al. | 6,323,566 B1 | 11/2001 | Meier |
| 6,006,216 A | 12/1999 | Griffin et al. | 6,325,285 B1 | 12/2001 | Baratelli |
| 6,012,049 A | 1/2000 | Kawan | 6,326,934 B1 | 12/2001 | Kinzie |
| 6,014,645 A | 1/2000 | Cunningham | 6,342,844 B1 | 1/2002 | Rozin |
| 6,018,717 A | 1/2000 | Lee et al. | 6,364,208 B1 | 4/2002 | Stanford et al. |
| 6,024,286 A | 2/2000 | Bradley et al. | 6,367,011 B1 | 4/2002 | Lee et al. |
| 6,029,149 A | 2/2000 | Dykstra et al. | 6,374,245 B1 | 4/2002 | Park |
| 6,038,584 A | 3/2000 | Balmer | 6,377,034 B1 | 4/2002 | Ivanov |
| 6,047,888 A | 4/2000 | Dethloff | 6,388,533 B2 | 5/2002 | Swoboda |
| 6,052,675 A | 4/2000 | Checchio | 6,390,375 B2 | 5/2002 | Kayanakis |
| 6,064,320 A | 5/2000 | dHont et al. | 6,400,272 B1 | 6/2002 | Holtzman et al. |
| 6,070,003 A | 5/2000 | Gove et al. | 6,402,028 B1 | 6/2002 | Graham, Jr. et al. |
| 6,072,870 A | 6/2000 | Nguyen et al. | 6,411,611 B1 | 6/2002 | Van der Tuijn |
| 6,073,840 A | 6/2000 | Marion | 6,415,978 B1 | 7/2002 | McAllister |
| 6,078,888 A | 6/2000 | Johnson, Jr. | 6,422,464 B1 | 7/2002 | Terranova |
| RE36,788 E | 7/2000 | Mansvelt et al. | 6,424,029 B1 | 7/2002 | Giesler |
| 6,088,686 A | 7/2000 | Walker et al. | 6,442,532 B1 | 8/2002 | Kawan |
| 6,092,057 A | 7/2000 | Zimmerman et al. | 6,457,996 B1 | 10/2002 | Shih |
| 6,101,174 A | 8/2000 | Langston | 6,466,804 B1 | 10/2002 | Pecen et al. |
| 6,102,162 A | 8/2000 | Teicher | 6,473,500 B1 | 10/2002 | Risafi et al. |
| 6,102,672 A | 8/2000 | Woollenweber | 6,480,100 B1 | 11/2002 | Frieden et al. |
| 6,105,008 A | 8/2000 | Davis et al. | 6,480,101 B1 | 11/2002 | Kelly et al. |
| 6,105,013 A | 8/2000 | Curry et al. | 6,481,621 B1 | 11/2002 | Herrendoerfer et al. |
| 6,105,865 A | 8/2000 | Hardesty | 6,481,632 B2 | 11/2002 | Wentker et al. |
| 6,109,525 A | 8/2000 | Blomqvist et al. | 6,484,937 B1 | 11/2002 | Devaux et al. |
| 6,112,152 A | 8/2000 | Tuttle | 6,490,443 B1 | 12/2002 | Freeny, Jr. |
| 6,115,360 A | 9/2000 | Quay et al. | 6,491,229 B1 | 12/2002 | Berney |
| 6,116,423 A | 9/2000 | Troxtell, Jr. et al. | 6,494,380 B1 | 12/2002 | Jarosz |
| 6,116,505 A | 9/2000 | Withrow | 6,507,762 B1 | 1/2003 | Amro et al. |
| 6,118,189 A | 9/2000 | Flaxl | 6,510,983 B2 | 1/2003 | Horowitz et al. |
| 6,121,544 A | 9/2000 | Petsinger | 6,510,998 B1 | 1/2003 | Stanford et al. |
| 6,123,223 A | 9/2000 | Watkins | 6,513,015 B2 | 1/2003 | Ogasawara |
| 6,129,274 A | 10/2000 | Suzuki | 6,529,880 B1 | 3/2003 | McKeen et al. |
| 6,133,834 A | 10/2000 | Eberth et al. | 6,535,726 B1 | 3/2003 | Johnson |
| 6,141,651 A | 10/2000 | Riley et al. | 6,546,373 B1 | 4/2003 | Cerra |
| 6,167,236 A | 12/2000 | Kaiser et al. | 6,547,133 B1 | 4/2003 | DeVries, Jr. et al. |

| Patent No. | Date | Inventor(s) |
|---|---|---|
| 6,549,912 B1 | 4/2003 | Chen |
| 6,560,581 B1 | 5/2003 | Fox et al. |
| 6,577,229 B1 | 6/2003 | Bonneau et al. |
| 6,578,768 B1 | 6/2003 | Binder et al. |
| 6,581,839 B1 | 6/2003 | Lasch et al. |
| 6,588,660 B1 | 7/2003 | Buescher et al. |
| 6,589,119 B1 | 7/2003 | Orus et al. |
| 6,608,995 B1 | 8/2003 | Kawasaki et al. |
| 6,609,655 B1 | 8/2003 | Harrell |
| 6,626,356 B2 | 9/2003 | Davenport et al. |
| 6,628,961 B1 | 9/2003 | Ho et al. |
| 6,650,887 B2 | 11/2003 | McGregor et al. |
| 6,665,405 B1 | 12/2003 | Lenstra |
| 6,674,786 B1 | 1/2004 | Nakamura et al. |
| 6,679,427 B1 | 1/2004 | Kuroiwa |
| 6,684,269 B2 | 1/2004 | Wagner |
| 6,687,714 B1 | 2/2004 | Kogen et al. |
| 6,690,930 B1 | 2/2004 | Dupre |
| 6,693,513 B2 | 2/2004 | Tuttle |
| 6,705,530 B2 | 3/2004 | Kiekhaefer |
| 6,711,262 B1 | 3/2004 | Vatanen |
| 6,732,936 B1 | 5/2004 | Kiekhaefer |
| 6,742,120 B1 | 5/2004 | Markakis et al. |
| 6,760,581 B2 | 7/2004 | Dutta |
| 6,789,012 B1 | 9/2004 | Childs et al. |
| 2001/0013542 A1 | 8/2001 | Horowitz et al. |
| 2001/0024157 A1 | 9/2001 | Hansmann et al. |
| 2001/0034565 A1 | 10/2001 | Leatherman |
| 2001/0039617 A1 | 11/2001 | Buhrlen et al. |
| 2002/0011519 A1 | 1/2002 | Shults |
| 2002/0028704 A1 | 3/2002 | Bloomfield et al. |
| 2002/0035548 A1 | 3/2002 | Hogan et al. |
| 2002/0052839 A1 | 5/2002 | Takatori |
| 2002/0062284 A1 | 5/2002 | Kawan |
| 2002/0074398 A1 | 6/2002 | Lancos et al. |
| 2002/0077837 A1 | 6/2002 | Krueger et al. |
| 2002/0077895 A1 | 6/2002 | Howell |
| 2002/0077992 A1 | 6/2002 | Tobin |
| 2002/0079367 A1 | 6/2002 | Montani |
| 2002/0092914 A1 | 7/2002 | Pentz et al. |
| 2002/0095343 A1 | 7/2002 | Barton et al. |
| 2002/0095389 A1 | 7/2002 | Gaines |
| 2002/0095587 A1 | 7/2002 | Doyle et al. |
| 2002/0097144 A1 | 7/2002 | Collins et al. |
| 2002/0107007 A1 | 8/2002 | Gerson |
| 2002/0107742 A1 | 8/2002 | Magill |
| 2002/0109580 A1 | 8/2002 | Shreve et al. |
| 2002/0111210 A1 | 8/2002 | Luciano, Jr. et al. |
| 2002/0113082 A1 | 8/2002 | Leatherman et al. |
| 2002/0116274 A1 | 8/2002 | Hind et al. |
| 2002/0120584 A1 | 8/2002 | Hogan et al. |
| 2002/0126010 A1 | 9/2002 | Trimble et al. |
| 2002/0131567 A1 | 9/2002 | Maginas |
| 2002/0138438 A1 | 9/2002 | Bardwell |
| 2002/0140542 A1 | 10/2002 | Prokoski et al. |
| 2002/0145043 A1 | 10/2002 | Challa et al. |
| 2002/0147913 A1 | 10/2002 | Lun Yip |
| 2002/0148892 A1 | 10/2002 | Bardwell |
| 2002/0152123 A1 | 10/2002 | Giordano et al. |
| 2002/0166891 A1 | 11/2002 | Stoutenburg et al. |
| 2002/0176522 A1 | 11/2002 | Fan |
| 2002/0178063 A1 | 11/2002 | Gravelle et al. |
| 2002/0178369 A1 | 11/2002 | Black |
| 2002/0185543 A1 | 12/2002 | Pentz et al. |
| 2002/0188501 A1 | 12/2002 | Lefkowith |
| 2002/0190125 A1 | 12/2002 | Stockhammer |
| 2002/0194303 A1 | 12/2002 | Suila et al. |
| 2002/0194503 A1 | 12/2002 | Faith et al. |
| 2002/0196963 A1 | 12/2002 | Bardwell |
| 2003/0009382 A1 | 1/2003 | DArbelott et al. |
| 2003/0014307 A1 | 1/2003 | Heng |
| 2003/0014357 A1 | 1/2003 | Chrisekos et al. |
| 2003/0014891 A1 | 1/2003 | Nelms et al. |
| 2003/0018532 A1 | 1/2003 | Dudek et al. |
| 2003/0025600 A1 | 2/2003 | Blanchard |
| 2003/0046228 A1 | 3/2003 | Berney |
| 2003/0057226 A1 | 3/2003 | Long |
| 2003/0057278 A1 | 3/2003 | Wong |
| 2003/0069828 A1 | 4/2003 | Blazey et al. |
| 2003/0069846 A1 | 4/2003 | Marcon |
| 2003/0112972 A1 | 6/2003 | Hattick et al. |
| 2003/0120554 A1 | 6/2003 | Hogan et al. |
| 2003/0121969 A1 | 7/2003 | Wankmueller |
| 2003/0132284 A1 | 7/2003 | Reynolds et al. |
| 2003/0140228 A1 | 7/2003 | Binder |
| 2003/0163699 A1 | 8/2003 | Pailles et al. |
| 2003/0167207 A1 | 9/2003 | Berardi et al. |
| 2003/0177347 A1 | 9/2003 | Schneier et al. |
| 2003/0183689 A1 | 10/2003 | Swift et al. |
| 2003/0183699 A1 | 10/2003 | Masui |
| 2003/0187786 A1 | 10/2003 | Swift et al. |
| 2003/0187787 A1 | 10/2003 | Freund |
| 2003/0187790 A1 | 10/2003 | Swift et al. |
| 2003/0187796 A1 | 10/2003 | Swift et al. |
| 2003/0195842 A1 | 10/2003 | Reece |
| 2003/0195843 A1 | 10/2003 | Matsuda et al. |
| 2003/0200184 A1 | 10/2003 | Dominguez et al. |
| 2003/0218066 A1 | 11/2003 | Fernandes et al. |
| 2003/0220876 A1 | 11/2003 | Burger et al. |
| 2003/0222153 A1 | 12/2003 | Pentz et al. |
| 2003/0225623 A1 | 12/2003 | Wankmueller |
| 2003/0225713 A1 | 12/2003 | Atkinson et al. |
| 2003/0227550 A1 | 12/2003 | Manico et al. |
| 2003/0233334 A1 | 12/2003 | Smith |
| 2004/0010462 A1 | 1/2004 | Moon et al. |
| 2004/0015451 A1 | 1/2004 | Sahota et al. |
| 2004/0029569 A1 | 2/2004 | Khan et al. |
| 2004/0039860 A1 | 2/2004 | Mills et al. |
| 2004/0127256 A1* | 7/2004 | Goldthwaite et al. ........ 455/558 |
| 2004/0139201 A1 | 7/2004 | Reed et al. |
| 2004/0176071 A1* | 9/2004 | Gehrmann et al. .......... 455/411 |
| 2004/0180657 A1* | 9/2004 | Yaqub et al. ............. 455/435.1 |
| 2004/0235450 A1* | 11/2004 | Rosenberg ................. 455/406 |
| 2005/0113137 A1* | 5/2005 | Rodriguez et al. .......... 455/558 |
| 2005/0221853 A1* | 10/2005 | Silvester ..................... 455/551 |

FOREIGN PATENT DOCUMENTS

| | | |
|---|---|---|
| EP | 0 358 525 A2 | 3/1990 |
| EP | 0 424 726 A1 | 10/1990 |
| EP | 0 933 717 A2 | 8/1999 |
| EP | 0 956 818 A1 | 11/1999 |
| EP | 0 959 440 A2 | 11/1999 |
| EP | 0 984 404 A2 | 3/2000 |
| EP | 1 016 947 A2 | 7/2000 |
| EP | 1 039 403 A2 | 9/2000 |
| EP | 1 104 909 A2 | 6/2001 |
| EP | 1 113 387 A2 | 7/2001 |
| EP | 1 199 684 A2 | 4/2002 |
| EP | 1 251 450 A1 | 10/2002 |
| GB | 2 347 537 A | 9/2000 |
| JP | 2000-1109 A | 1/2000 |
| JP | 2000-015288 A | 1/2000 |
| JP | 2000-40181 A | 2/2000 |
| JP | 2000-67312 A | 3/2000 |
| JP | 2000-207641 A | 7/2000 |
| JP | 2001-5931 A | 1/2001 |
| JP | 2001-283122 A | 10/2001 |
| WO | WO 95/32919 A1 | 12/1995 |
| WO | WO 99/03057 A1 | 1/1999 |
| WO | WO 00/10144 A1 | 2/2000 |
| WO | WO 00/38088 A1 | 6/2000 |
| WO | WO 01/04825 A1 | 1/2001 |
| WO | WO 01/15098 A1 | 3/2001 |
| WO | WO 01/43095 A2 | 6/2001 |
| WO | WO 01/72224 A1 | 10/2001 |

| | | |
|---|---|---|
| WO | WO 01/77856 A1 | 10/2001 |
| WO | WO 01/80473 A2 | 10/2001 |
| WO | WO 01/86535 A1 | 11/2001 |
| WO | WO 01/90962 A1 | 11/2001 |
| WO | WO 01/95243 A2 | 12/2001 |
| WO | WO 02/01485 A1 | 1/2002 |
| WO | WO 02/13134 A2 | 2/2002 |
| WO | WO 02/21903 A1 | 3/2002 |
| WO | WO 02/063545 A2 | 8/2002 |
| WO | WO 02/065246 A2 | 8/2002 |
| WO | WO 02/065404 A2 | 8/2002 |
| WO | WO 02/069221 A1 | 9/2002 |
| WO | WO 02/073512 A1 | 9/2002 |
| WO | WO 02/091281 A2 | 11/2002 |
| WO | WO 02/097575 A2 | 12/2002 |
| WO | WO 02/101670 A2 | 12/2002 |

OTHER PUBLICATIONS

"Physical Reality: A Second Look", Ken Sharp, Senior Technical Editor, http://www.idsystems.com/reader/1999_03/phys0399_pt2/phys0399_pt2.htm (6 pages).

"Magic Wands' to Speed Mobile Sales", BobBrewin, Jan. 15, 2001, http://www.computerworld.com/mobiletopics.mobile/story/1,10801,563300.html (4 pages).

"Mobile Speedpass Goes Global as Mobil Singapore Rolls Out Asia's First RFID-Based Pay-At-The-Pump System", Press Release, Apr. 5, 1999, http://www.ti.com/tiris/docs/news_releases/rel12.htm (3 pages).

"Speedpass Unleashed", Jun. 4, 2002 http://www.cardweb.com/cardtrak/news/cf2_20a_97.html (2 pages).

Prophecy Central Update #9, Oct. 10, 1997, http://www.bible-prophecy.com/pcu9.htm (5 pages).

International Newsletter of the TI RFID Group, Issue 20, 2000 (12 pages).

"CES: Microsoft's SPOT Technology has Humble Origins", by James Niccolai, Jan. 10, 2003, http://archive.inforworld.com/articles/hn/xml/03/01/10/030110hnspot.xml?s=IDGNS (3 pages).

"Microsoft: See SPOT Run On Your Wrist", by Richard Shim, Jun. 5, 2003, http://news.com.com/2100-1041_3-1013442.html?tag=fd_top (1 page).

"Networking: Microsoft SPOT", by Jeremy A. Kaplan, Jul. 1, 2003, http://www.pcmag.com/print_article/0,3048,a=43561,00.asp (2 pages).

"Microsoft Launches Smart Personal Object Technology Initiative", Press Release from COMDEX Fall 2002, Nov. 17, 2002, http://www.Microsoft.com/presspass/features/2002/nov02/11-17SPOT.asp (4 pages).

"Bank Extends RFID Payment Pilot: Bank of America will continue to test its QuickWave RFID payment card for another three months", RFID Journal, Jan. 23, 2003.

"MasterCard to Test RFID Card: PIlot will test whether consumers, merchants and credit card issuers value "contactless" payments", RFID Journal, Dec. 20, 2002.

"Vendors Target Amusement Parks: Protecting children and enabling cashless payments make RFID an appealing option for the entertainment industry", RFID Journal, Nov. 27, 2002.

"Inside's Next-Gen Smart Card: The French company plans to introduce an RFID card that uses a 16-bit microprocessor and new encryption technology", RFID Journal, Oct. 29, 2002.

"Sony, Philips Creating RFID Link: Consumer electronics giants are jointly developing a new RFID standard for payments and for communication between devices", RFID Journal, Sep. 17, 2002.

"Japan Gets Digital Ticket System: A national ticket seller and phone company are teaming up to create an electronic ticket", RFID Journal, Aug. 31, 2002.

"Security for Wireless Java: NTRU, a startup that offers security software, has released of Java version of its NTRU encryption algorithm", RFID Journal, Jun. 27, 2002.

"Making RFID Payments Ubiquitous: Philips and Visa want people to be able to pay for goods and services anywhere by using RFID chips embedded in the phones and other devices", RFID Journal, Jun. 2, 2003.

"RFID Smart Cards Gain Ground: The convenience of contactless transactions is driving widespread adoption of contactless smart cards", RFID Journal, Apr. 9, 2003.

"TI Embarces Prox Card Standard: Texas Instruments ISO 14443 payment platform promises faster data transfer rates and more security", RFID Journal, Mar. 6, 2003.

"Multiple Frequency Transponders: Volume production of dual-band RFID chips begins", Frontline Solutions, Jul. 16, 2003.

Functional Specification, Standard Card IC MFI IC S50, Philips Semiconductors, Product Specification Rev. 5.1 May 2001.

* cited by examiner

SYSTEM AND METHOD FOR REMOTELY INITIALIZING A RF TRANSACTION

CROSS-REFERENCE TO RELATED APPLICATIONS

This invention claims priority to and the benefits of U.S. Provisional Application Ser. No. 60/512,297, filed Oct. 17, 2003. This invention is also a continuation-in-part of, and claims priority to, U.S. application Ser. No. 10/746,781, entitled "A SYSTEM AND METHOD FOR MANUFACTURING A PUNCH-OUT RFID TRANSACTION DEVICE," filed Dec. 24, 2003. This invention is also a continuation-in-part of, and claims priority to, U.S. patent application Ser. No. 10/192,488, entitled "SYSTEM AND METHOD FOR PAYMENT USING RADIO FREQUENCY IDENTIFICATION IN CONTACT AND CONTACTLESS TRANSACTIONS," filed Jul. 9, 2002 (which itself claims priority to U.S. Provisional Patent Application No. 60/304,216, filed Jul. 10, 2001).

The invention is also a continuation-in-part of and claims priority, to U.S. patent application Ser. No. 10/340,352, entitled "SYSTEM AND METHOD FOR INCENTING PAYMENT USING RADIO FREQUENCY IDENTIFICATION IN CONTACT AND CONTACTLESS TRANSACTIONS," filed Jan. 10, 2003 (which itself claims priority to U.S. Provisional Patent Application No. 60/396,577, filed Jul. 16, 2002).

The entire contents of each of these applications is hereby incorporated by reference.

FIELD OF INVENTION

The present invention generally relates to transaction devices, and more particularly, to a system and method remotely configuring an RF module for RF transaction completion.

BACKGROUND OF INVENTION

For many years, personal checks, travelers checks, money orders, traditional currency and the like were the most popular means for paying for goods or services. In recent years, however, transaction cards (e.g., credit cards, debit cards, smart cards, pre-paid cards, and the like), have developed as a popular substitute for cash or personal checks. The average consumer often prefers the transaction cards over traditional currency since the transaction cards may be easily replaced by the card issuer if the user loses or misplaces the card or the card is stolen.

As the number of issued transaction cards increases, so do the security issues surrounding transaction card transactions. As a consequence, the transaction card industry started to develop more sophisticated transaction cards which allowed for the reading, transmission, and authorization of transaction card data, while lessening the elevating security concerns. One alternative transaction card that has gained popularity is the smart card. Smart cards are capable of transferring user information during transaction completion without the user ever having to lose physical control of the device. Thus, smart cards enhance the security of the transactions by virtually eliminating the need for the user to hand the card over to a merchant salesperson for transaction completion.

While smart cards enhanced some security surrounding transaction devices, smart cards did little to address fraud issues associated with a lost or stolen transaction card. Because smart cards are manufactured with the same size dimensions as traditional transaction cards, the user did little more to secure the smart card against loss than the user did to secure a traditional credit card. This revelation has led transaction card providers to search for a suitable technology that encompassed the enhanced security given by smart cards and more. One such technology is radio frequency (RF) technology.

Like barcode and voice data entry, RF is a contactless information acquisition technology. RF systems are wireless, and are usually extremely effective in hostile environments where conventional acquisition methods fail. In general, RF technology permits a card manufacturer to provide for a dimensionally smaller transaction device than a smart card or traditional transaction card. RF technology, therefore, is better suited for securing against loss or theft. For example, the RF technology may be embodied in a form factor attachable to the account holder's person or to an often used (or often handled) personal article, such as a key chain, fob or tag. The RF transaction device may be attached to the personal article in an unobtrusive manner because of its smaller size. As such, the user has increased security against loss or theft, since the user handles the personal article frequently, permitting the user to repeatedly be reminded that the card is present.

One of the more visible transaction devices which uses RFID technology is found in the introduction of Exxon/Mobil's Speedpass® and Shell's EasyPay® products, which are attachable to a user's key chain. These products use RFID transponders placed in a fob or tag of irregular shape which enables automatic identification of the user when the fob is presented at a merchant Point of Sale (POS) device. Fob identification data is typically passed to a third party server database, where the identification data is referenced to a customer (e.g., user) credit or debit account for completion of a transaction.

By providing a RF transaction device (e.g., fob) as described above, transaction account providers are able to attract account users in increasing numbers. The account users often prefer account providers that offer the RF transaction device option because of the convenience of use and the security using a RF transaction fob provides. The increased popularity of the RF fob has not gone unnoticed. Transaction account providers are now looking for various other devices in which to place RF technology for convenient consumer use. These other devices may be devices that the consumer uses more frequently than a traditional credit card or smart card.

One suitable device is the mobile telephone. Mobile telephones are typically connected to a telephone network using a wireless connection. Because of their portability, users frequently carry mobile telephones with them throughout their day. Users often take their mobile telephones with them to the office, in the car, and wherever they might go. In this manner, functions within the mobile telephone are available to the user throughout the day. Moreover, the portability of mobile telephones, elevates mobile telephones to an important piece of equipment in consumers' every day lives.

Another suitable device is the portable personal computer. As personal computers have increased in power and decreased in size, portable personal computers have become more useful and powerful. One smaller version of the personal computer design that has proven useful and quite popular is the so-called personal digital assistant (PDAs), such as Newton.RTM, by Apple Computer, Inc. In general, the average consumer uses the PDA to store telephone numbers and to manage the user's everyday schedule. However, because PDAs are highly programmable, PDAs may be loaded with various software packages that provide other functionality, such as wireless sending and receiving of data. As such, because of the increased popularity PDA use has become prevalent for managing a user's everyday affairs.

Both mobile telephones and miniaturized portable personal computers, such as PDAs, suffer from one drawback in that they are generally not configured for use in any other way than originally intended. Electronics designers are constantly looking for ways to expand the functionality of the aforementioned mobile devices since the mobile devices are gaining increasing popularity amongst consumers. For example, it would be desirable to configure the mobile devices for transaction completion. Until then, the ordinary consumer is forced to carry the mobile device and at least one transaction device, such as a credit card, debit card, loyalty card, or radio frequency transaction device (e.g., SPEEDPASS™ and EXPRESSPAY™) on his person. That is, the advent of the technology era has increased a need to combine the functionality of the mobile devices with the transaction completion capability of the transaction devices to limit the number of devices carried by the consumer.

SUMMARY OF INVENTION

The present invention relates to a system and method for providing a RF operable transaction device that may be used to convert any article to a RF transaction device. Specifically, the present invention relates to a method of providing a RF module that may be manufactured using conventional RF transaction card manufacturing machinery. The RF module may also be personalized using traditional personalizing machinery and processes.

It is, therefore, an object of the present invention to provide a RF operable transaction device manufacturing system and method which requires little retrofitting of conventional transaction card manufacturing and personalization machinery.

In one embodiment, the present invention relates to a process for producing a RF operable transaction device, having any one or more features, such as a holographic foil, integrated circuit chip, silver magnetic stripe with text on the magnetic stripe, opacity gradient, perforations included in the transparent device body for forming an outline of a shape, and an "active thru" date on the front of the device.

In one aspect, the RF transaction device of the present invention may use RF technology to initiate and complete financial transactions. In that regard, the RF module included in the device may include one or more RF operable transponders and antennas, which are typically included during the transaction device fabrication. The system in which the RF transaction device may be used may include a RFID reader operable to provide a RF interrogation signal for powering the RF module, receive a RF module RF signal including RF module account data, and provide RF module account data for transaction processing. The RFID reader may include an RFID reader protocol/sequence controller in communication with one or more interrogators for providing an interrogation signal to a transponder of the RF module, a RF authentication circuit for authenticating the signal received from the RF module, and a serial or parallel interface for interfacing with a point-of-interaction device.

The RFID reader may be configured to send a standing RF recognition signal which may be continuously or intermittently transmitted from the RFID reader via radio frequency (or electromagnetic) propagation. In one instance, the transaction device may be placed within proximity to the RFID reader such that the RF recognition signal may interrogate the RF module and initialize RF module identification or authorization procedures.

In another aspect of the invention, a RF module is provided which may be issued to a user in a transaction device transporter wherein the user may remove the transaction device from the transporter for use with any form factor. In one exemplary transaction device manufacturing method, a plurality of transporter and RF modules (called "transaction device combination" herein) are manufactured simultaneously on a single sheet using conventional manufacturing machinery. Each of the plurality of transaction device combinations is manufactured as a removable subpart the sheet of the plurality of transaction device combinations, wherein each combination may be an independent operable RF transaction device, which is ISO/7810-1985 compliant in size. As such, the transaction device combination may be manufactured, stamped, and/or cut using conventional manufacturing equipment.

The transaction device transporter, including the removable transaction device, is manufactured with at least one border of the transaction device transporter directly adjacent a border of the next adjacent transporter, forming a sheet of conjoined transaction device transporters. In one embodiment, the sheet of transporters is manufactured including RF operable transaction devices. In one embodiment, the sheet is manufactured with RF operable transaction devices including conventional RF data transmission circuitry.

Once the sheet of transaction device combinations is manufactured, the sheet may then be fed through a stamping device for imprinting an outline of the transaction device (e.g., key fob) within a single transporter. The outline of the transaction device is imprinted in the transporter with sufficient depth such that the transaction device and the RF module may be removed from the transporter with minimum physical force. The removable transaction device outline is imprinted such that the transaction device RF circuitry (called "RF module" herein), is included within the shape stamped (or imprinted) into the transaction device transporter, with at least a single imprint included within the transporter's borders. As such, the outline of the transaction device may typically serve as the shape of the transaction device which may be removed from the transporter.

The sheet may then be cut along the borders of the transaction device transporter into conventional transaction card dimensions, such as, for example, the ISO/IEC 7812 standardized card dimensions noted above. In one embodiment, the sheet is cut such that the transaction card shaped transaction device combination resulting from the cutting process includes the removable transaction device. The resulting transaction device combination may then be delivered to a transaction device user, who may remove ("punchout") the removable transaction device from the transaction device transporter by, for example, applying minimal physical force along lines (e.g., alignment lines) defining the shape of the transaction device imprinted on the transporter. Once removed, the RF transaction device may be used to complete a RF transaction since the transaction device includes the RF module. Further, the outline of the imprinting may serve to define the shape of the transaction device. The transaction device manufacturer may predetermine the shape of the transaction device and imprint the predetermined shape in the transporter.

In another embodiment, the transaction device may not be removed from the transporter. Instead, the transaction device combination may be left intact. The combination may be used to complete a RF transaction since the RF module is included in the transaction device (which is included in the transaction device combination). In this way, the transaction device combination may be used in similar manner as a conventional RF transaction device to complete a transaction. That is, a user may position the transaction device combination in proximity to a RFID reader. The RF module may then provide transaction device account information (e.g., account number, user identifier, device identifier) to the reader, which may forward the information to a merchant system or POS for transaction completion.

Alternatively, the transaction device combination may be equipped with a traditional magnetic stripe, which is ordinarily ISO/IEC 7800 et al., compliant. The magnetic stripe may include user account data which may be provided to a conventional magnetic stripe reader for completing a transaction using traditional magnetic stripe data processing methods. Thus, the user may use the transporter and RF transaction device in similar manner as a traditional credit card or debit card, and the like.

In another exemplary embodiment, the transaction card body is cut and the transaction device outline is imprinted simultaneously. In this instance, the card manufacturer may utilize a cutting machine configured to imprint an outline of the removable transaction device when the cutting of the transporter is performed. In this way, only one machine action is necessary to cut the transporter body and imprint the removable transaction device outline.

In yet another exemplary embodiment, the transaction device includes a RF module completely contained within the transaction device outline formed by the imprinting action. The transaction device may be formed or shaped using any desired outline. For example, a suitable outline such as an irregularly shaped key fob outline may be pressed (e.g., imprinted) within the perimeter of each of the plurality of transaction device transporters. The transaction device outline may be pressed or imprinted into the transporter such that the RF module is contained within the transaction device outline. The transaction device may then be "punched out" of ("removed from") the transporter by placing minimal physical force at the transaction device outline, such that the resulting RF transaction device is shaped in the transaction device outline provided.

In yet another exemplary embodiment of the invention, the transaction device manufacturer may manufacture a transaction device sheet including the RF module wherein the sheet may be cut in the traditional credit card ISO/IEC 7800 et al., compliant shapes and the transaction device is cut in any shape as desired for a RF transaction device (e.g., teardrop fob shaped). In this way, a transaction device manufacturer may form both transaction cards and irregularly shaped RF transaction devices on the same sheet simply by designating the proper design or shape to be made.

In still another aspect, the invention includes a means for securing the transaction device to a user's person or to a user's frequently used personal apparatus. For example, in one particular embodiment, the outline of the transaction device may be shaped to include an opening or aperture for securing the transaction device to, for example, a chain, key ring, ring, watch, rope, or the like. The key ring or chain, for example, may be inserted through the opening to secure the payment device to the chain or key ring to guard against the payment device being easily lost or stolen.

In another exemplary embodiment, the RF module may be removed from the transaction device for use in completing a transaction independently of the transaction device or the transporter. The outline of the module may additionally be pressed inside a transaction device outline as well, although not required. In this instance, an outline of the RF module may be imprinted on the transaction device transporter wherein the module is positioned inside the transporter outline. The RF module outline may be imprinted or pressed into the transporter at sufficient depth to permit the module to be easily removed, in similar manner as discussed with the transaction device. The module may be removed from the transporter using any of the methods described herein.

Once removed, the RF module may be secured to a mobile device such as a mobile telephone, PDA or the like, for converting the mobile device for use as a RF transaction device. The module may be secured externally to the mobile device housing using an independent portable carrier, an adhesive or other attachment method. The portable carrier may be attachable to the mobile device and may be configured to encase a portion of the RF module and lock the module in place to the mobile device body.

In yet another exemplary embodiment, the RF module may be placed in physical and logical communication with the internal functional components of the mobile device (e.g., mobile device circuitry). The RF module may include electrical connections for communicating with the mobile device microprocessor. In this way, the mobile device may be used to power the RF module, transfer data between the mobile device microprocessor, mobile account issuer, and RF module account issuer, and provide secondary identification means for the RF transaction authentication process, or to personalize the RF module where necessary. Additionally, the RF module may be configured to transmit information to a mobile device universal bus (USB) connector for transmitting the information to an account issuer or merchant system for transaction processing. The mobile device USB connector may permit the RF module to communicate with an issuer or merchant provided kiosk, or to a transaction processing network for transaction completion.

Additional features and advantages of the present invention are described in, and will be apparent from, the detailed description of the present exemplary embodiments and from the drawings.

BRIEF DESCRIPTION OF DRAWINGS

A more complete understanding of the present invention may be derived by referring to the detailed description and claims when considered in connection with the Figures, where like reference numbers refer to similar elements throughout the Figures, and:

DETAILED DESCRIPTION

The present invention relates to contactless transaction devices and methods of making and using the same. Specifically, the present invention relates to a system and method for providing a RF transaction device using conventional transaction card manufacturing procedures. The present invention addresses the shortcomings in the prior art by providing a cost effective method for manufacturing irregular shaped RF transaction devices.

The present invention may be described herein in terms of functional block components, screen shots, optional selections and various processing steps. Such functional blocks may be realized by any number of hardware and/or software components configured to perform to specified functions. For example, the present invention may employ various integrated circuit components (e.g., memory elements, processing elements, logic elements, look-up tables, and the like), which may carry out a variety of functions under the control of one or more microprocessors or other control devices. Similarly, the software elements of the present invention may be implemented with any programming or scripting language such as C, C++, Java, COBOL, assembler, PERL, extensible markup language (XML), JavaCard and MULTOS with the various algorithms being implemented with any combination of data structures, objects, processes, routines or other programming elements. Further, it should be noted that the present invention may employ any number of conventional techniques for data transmission, signaling, data processing, network control, and the like. For a basic introduction on cryptography, review a text written by Bruce Schneier entitled "Applied Cryptography: Protocols, Algorithms, and Source Code in C," published by John Wiley & Sons (second edition, 1996), herein incorporated by reference.

In addition, many applications of the present invention could be formulated. The exemplary network disclosed herein may include any system for exchanging data or transacting business, such as the internet, an intranet, an extranet, WAN, LAN, satellite communications, and/or the like. It is noted that the network may be implemented as other types of networks, such as an interactive television network (ITN).

Figure 1:
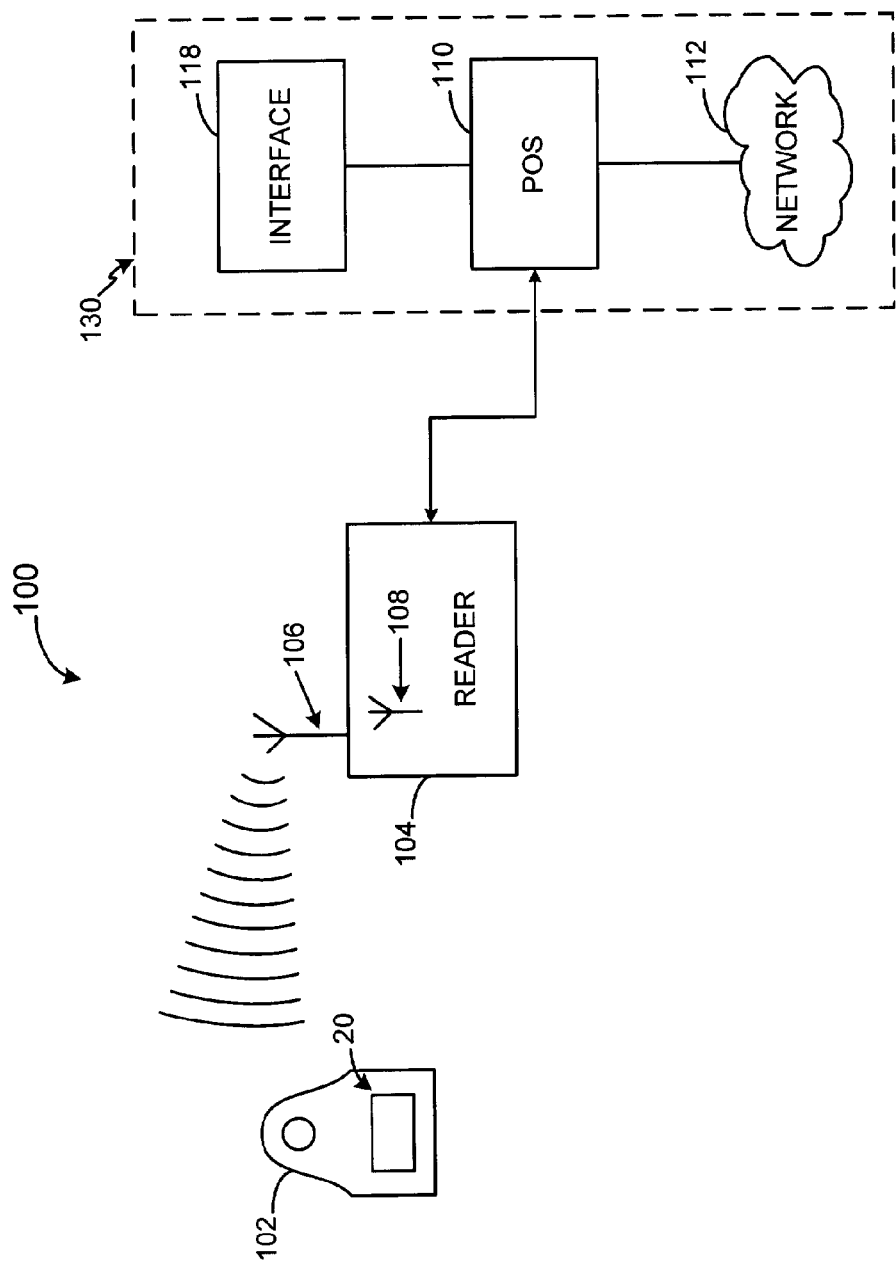
FIG. 1 illustrates an exemplary RF transaction device system in accordance with an exemplary embodiment of the present invention.

FIG. 1 illustrates an exemplary Radio Frequency (RF) transaction device system 100 for use with the present invention, wherein exemplary components for use in completing a contactless transaction are depicted. In general, the operation of system 100 may begin when a contactless transaction device 102 is presented for payment. The device may be presented for payment by, for example, waiving the device 102 in proximity to a RFID reader 104. The RFID reader 104 provides an interrogation signal for powering the device 102 and the transaction device 102 is positioned in such proximity to the reader 104 that the device 102 may be positioned to be in communication with the transaction device 102 via RF transmission of the interrogation signal. The interrogating signal may power the contactless transaction device 102 thereby initiating operation of the device 102. The contactless transaction device 102 may provide a transponder identifier and/or account identifier to the RFID reader 104, via RF transmissions and the reader 104 may further provide the identifier to the merchant system 130 POS device 110 for transaction completion. Details for the operation of an exemplary RF transponder system for transaction completion is found in U.S. patent application Ser. No. 10/192,488, entitled "SYSTEM AND METHOD FOR PAYMENT USING RADIO FREQUENCY IDENTIFICATION IN CONTACT AND CONTACTLESS TRANSACTIONS," and its progeny which is hereby incorporated by reference.

Although the point-of-interaction device is described herein with respect to a merchant point-of-sale (POS) device, the invention is not to be so limited. Indeed, a merchant POS device is used herein by way of example, and the point-of-interaction device may be any device capable of receiving device account data. In this regard, the POS may be any point-of-interaction device or transaction acceptance device enabling the user to complete a transaction using an RF responsive transponder.

The RFID reader 104 may be configured to communicate using a RF internal antenna 106. Alternatively, RFID reader 104 may include an external antenna 108 where the external antenna 108 may be made remote to the RFID reader 104 using a suitable cable and/or data link. RFID reader 104 may be further in communication with a transaction completion system (e.g., merchant system 130) via a data link. In one exemplary embodiment the transaction completion system may include POS device 110 in communication with a RFID reader 104 (via a data link), and a customer interface 118 in communication with the POS device 110. The POS 112 may be in further communication with an account issuer system (not shown) via a network 112 which may be provided the account number and any transaction identifying information (e.g., time, duty, cost of transaction, item negotiated) for transaction completion.

The terms "Internet" or "network" as used herein, may refer to the Internet, any replacement, competitor or successor to the Internet, or any public or private inter-network, intranet or extranet that is based upon open or proprietary protocols. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); LOSHIN, TCP/IP CLEARLY EXPLAINED (1997). All of these texts are hereby incorporated by reference.

By being in "communication," what is described may be that a signal may travel to/from one component of the invention to another. The components may be directly connected to each other or may be connected through one or more other devices or components. The various coupling components for the devices can include but are not limited to the Internet, a wireless network, a conventional wire cable, an optical cable or connection through air, water, or any other medium that conducts signals, and any other coupling device or medium.

Where required, the system user may interact with the system to complete a transaction via any input device or user interface 118, such as, a keypad, keyboard, mouse, kiosk, personal digital assistant, handheld computer (e.g., Palm Pilot®, Blueberry®), cellular phone and/or the like. Similarly, the invention could be used in conjunction with any type of personal computer, network computer, work station, minicomputer, mainframe, or the like running any operating system such as any version of Windows, Windows NT, Windows 2000, Windows 98, Windows 95, MacOS, OS/2, BeOS, Linux, UNIX, Solaris or the like. Moreover, although the invention may frequently be described as being implemented with TCP/IP communications protocol, it should be understood that the invention could also be implemented using SNA, IPX, Appletalk, IPte, NetBIOS, OSI or any number of communications protocols. Moreover, the system contemplates the use, sale, or distribution of any goods, services or information over any network having similar functionality described herein.

A variety of conventional communications media and protocols may be used for the data links. For example, data links may be an Internet Service Provider (ISP) configured to facilitate communications over a local loop as is typically used in connection with standard modem communication, cable modem, dish networks, ISDN, Digital Subscriber Lines (DSL), or any wireless communication media. In addition, the merchant system 130 including the POS device 110 and host network 112 may reside on a local area network which interfaces to a remote network (not shown) for remote authorization of an intended transaction. The merchant system 130 may communicate with the remote network via a leased line, such as a T1, D3 line, or the like. In addition, the merchant system 130, including the POS 110 and host network 112, may reside on a local area network, which interfaces with a remote network (not shown) for remote transaction authorization. Such communications lines are described in a variety of texts, such as, "Understanding Data Communications," by Gilbert Held, which is incorporated herein by reference.

A device account identifier or account number, as used herein, may include any identifier for a transaction device which may be correlated to a user transaction account (e.g., credit, charge debit, checking, savings, reward, loyalty, or the like) maintained by a transaction account provider (e.g., payment authorization center). A typical transaction account identifier (e.g., account number) may be correlated to a credit or debit account, loyalty account, or rewards account maintained and serviced by such entities as American Express, Visa and/or MasterCard or the like.

In general, the transaction devices 102 which use the above RF transmission process may take any form. The RF module 20 may be included in RF transaction device 102 for use in completing a RF transaction. Any transaction device discussed herein, excluding the RF module 20, may also be termed a mobile device 102, wherein the mobile device is configured to accept the RF module 20. In an exemplary embodiment, the mobile device 102 includes a microprocessor for controlling the mobile device 102 functional components as discussed below. In one embodiment, the mobile device 102 is one whose ordinary function is not for financial transaction completion or the completion of a transaction using loyalty or rewards points, etc. In this instance, the mobile device may be termed a "non-traditional transaction device" herein.

Figure 5:
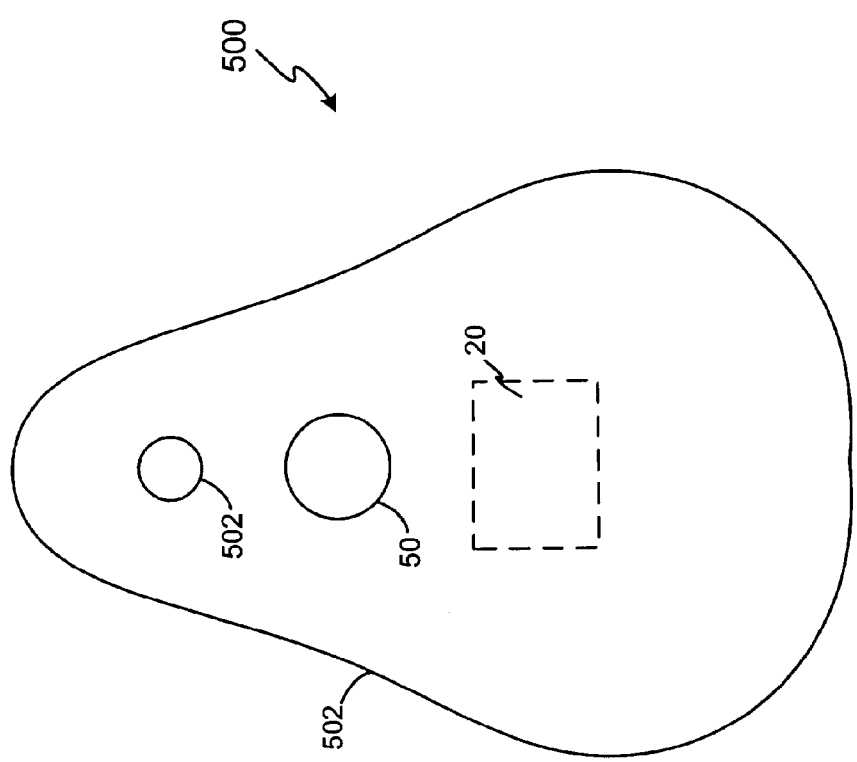
FIG. 5 depicts the front surface of an exemplary RF transaction device in accordance with an exemplary embodiment of the present invention.

To facilitate understanding of this invention, FIG. 5 illustrates a RF transaction device 102 shaped as a teardrop shaped transaction device 102, although other shapes are contemplated. FIG. 5 shows an exemplary teardrop shaped RF transaction device 102, including RF module 20 for conducting a RF transaction.

The RF transaction device 102 (described more fully below) may come in many different shapes. Because a typical card manufacturer may provide both traditional credit card shaped transaction cards and irregularly shaped RF transaction devices, the manufacturer must have proper machinery for cutting sheets of the devices into the appropriate device size. The present invention provides a system and method for forming the irregularly shaped transaction devices, which utilizes conventional dimensional standards for transaction cards (e.g., credit cards, smart cards, etc.) irrespective of the RF transaction device shape. This, in turn, allows the manufacturer to manufacture irregularly shaped transaction devices using conventional card manufacturing machinery, with little retrofitting. The invention allows for a manufacturer to use coextensive transaction card and RF transaction device manufacturing processes which produce both transaction devices simultaneously or individually. The process is termed coextensive since identical material layers and/or circuitry may be used whether the card manufacturer desires to cut transaction cards or RF transaction devices.

Figure 2:
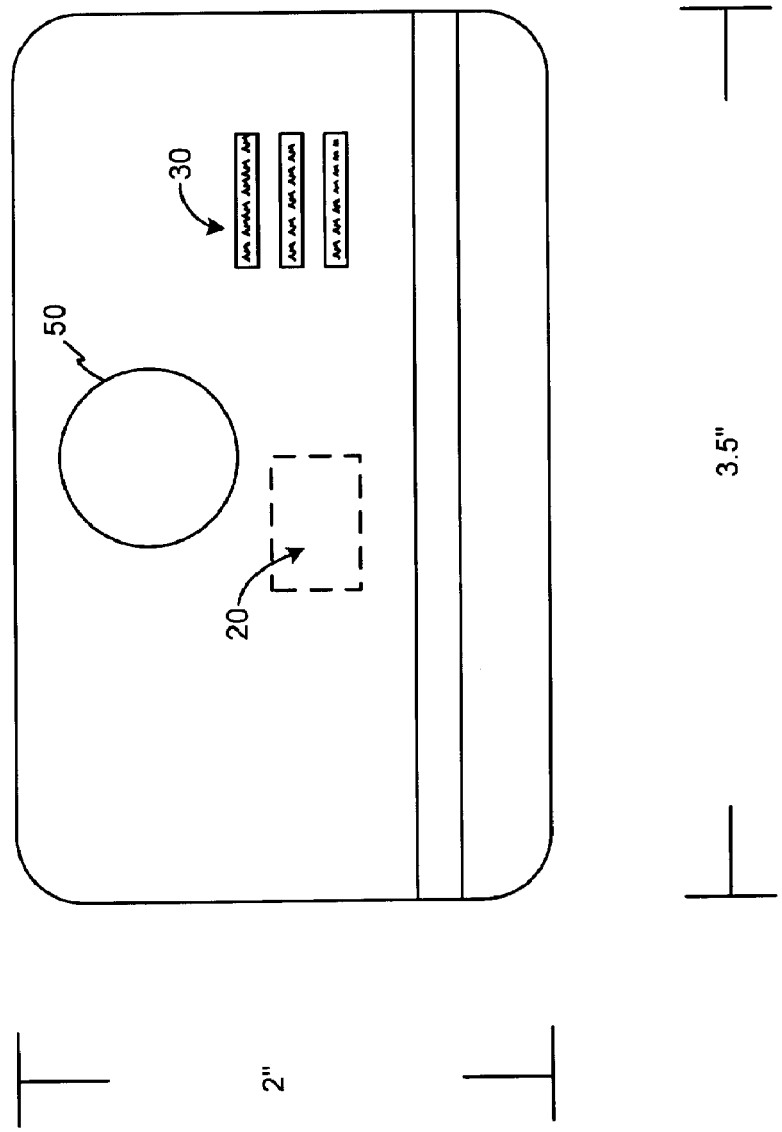
FIG. 2 illustrates an exemplary prior art transaction card in accordance with an exemplary embodiment of the present invention.

FIG. 2 depicts the dimensional relationship of an exemplary transaction card 1. Transaction card 1 is shown with dimensional characteristics which conform to the ISO card size standard, typically ISO/IEC 7800 et al. Generally, transaction card 1 is about 2"×3.5".

Figure 3:
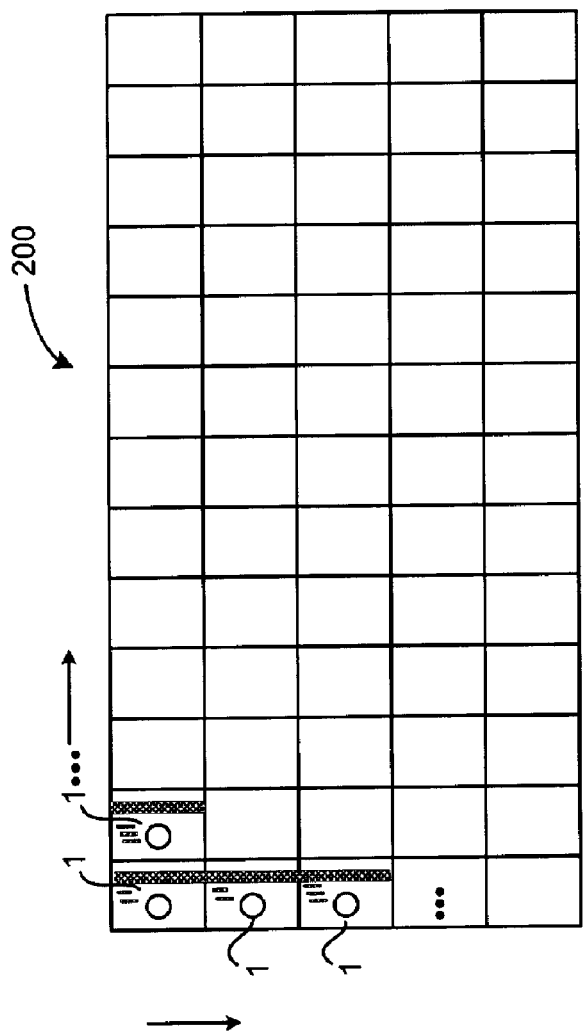
FIG. 3 illustrates an exemplary sheet of plurality of transaction cards in accordance with an exemplary embodiment of the present invention.

Manufacturers of transaction cards 1 take advantage of mass production techniques when manufacturing transaction cards. Instead of producing the cards 1 individually, the cards 1 are produced en masse in sheets 200 which are then cut into the appropriate individual size. FIG. 3 is a depiction of an exemplary sheet 200 of a plurality of transaction cards 1, which may be manufactured using a conventional transaction card manufacturing process.

Sheet 200 may be prepared using any conventional method of manufacturing a sheet of multiple transaction devices 1. The present invention modifies conventional methods by including perforation, impressing and RF circuitry as discussed below. The following description is an exemplary method of manufacturing sheet 200 according to the invention. The description is offered to facilitate a understanding of the invention and not by way of limitation.

Figure 4:
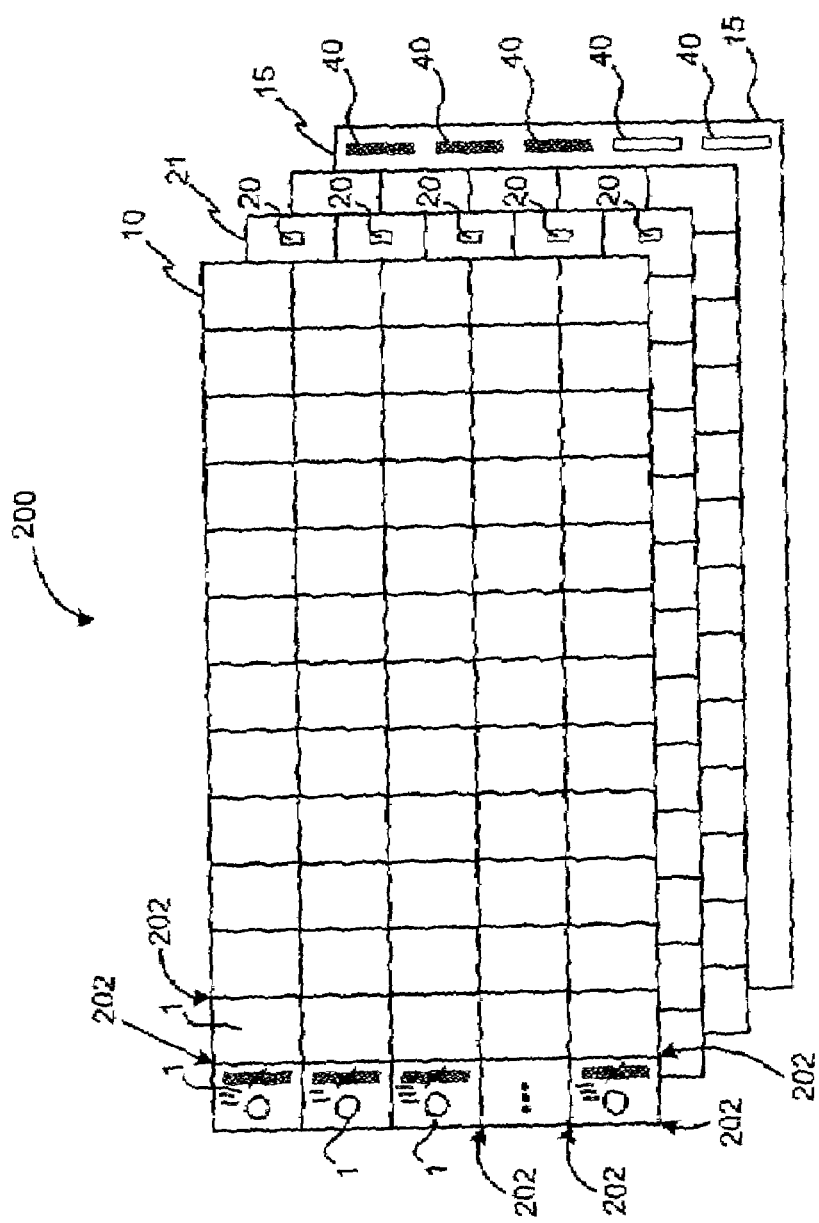
FIG. 4 illustrates an exploded view of an exemplary sheet of a plurality of transaction cards including a RF circuitry sheet in accordance with an exemplary embodiment of the present invention.

In the exemplary embodiment shown, sheet 200 may be formed using multiple material layers. FIG. 4 illustrates an exploded view of an exemplary sheet 200, which may be used with the present invention. Sheet 200 includes a front material layer 10 and back material layer 12 consisting of a plastic substrate such as, for example, clear core PVC. One skilled in the art will appreciate that layers 10 and 12 of card 1 may be any suitable transparent, translucent and/or opaque material such as, for example, plastic, glass, acrylic and/or any combination thereof. Each material layer 10, 12 is substantially identical and is preferably about 3"×4" (622 mm×548 mm) and about 0.005–0.350 inches, or more preferably 0.01–0.15 inches or 13.5 mil thick.

The fabrication of the individual card sheets 200 may include either direct layout (9 layers) of film or the use of a sub-assembly (5 layers). An exemplary sub-assembly layer 21 may consist of 5 layers of film with room temperature tack adhesive applied over thermoset and thermoplastic adhesives. The resulting cards comprise (from the card front towards the card back) 2.0 mil outer laminate (PVC, polyvinylchloride) including having a holographic foil, embossed surface, chip and other indicia on its surface, 9.0 mil printed PVC core with print side out (card front), 2.0 mil PVC adhesive, 1.7 mil PET GS (extrusion coated polyethyleneterephthalate—gluable/stampable) manufactured by D&K (525 Crossen, Elk Grove Village, Ill. 60007), 2.0 mil PET IR blocking film, 1.7 mil PET GS, 2.0 mil PET adhesive, 9.0 mil printed PVC core with the print side out (card back), and 2.0 mil outer back laminate with a signature panel, applied magnetic stripe and other indicia. Optimally, the PET IR blocking film is fabricated in the middle of the layers to balance the card and minimize warping of the resulting card product.

After eventually combining the sheets, by preferably adhering the front layer 10 on top of the back sheet 12, the total thickness of the transaction card 1, including the subassembly sheet 21, is about 0.032 in. (32 mil.), which is within the ISO thickness standard for smart cards. In one embodiment, the subassembly sheet 21 may be formed including RF module 20, which may be of sufficient thickness to maintain the smart card standard thickness. Alternatively, the RF module 20 may be embedded in the sheet 12 or card 1 via a suitable conventional milling process. Because the RF module 20 may eventually embedded into the surface of the substrate or the subassembly 21 as described more fully below, the module 20 does not affect the thickness of the overall card 1. Moreover, the about 3'×4' sheets include predefined alignment markings which define the boundaries of the individual cards 1 to be cut from the sheet. Each exemplary sheet yields over 50 transaction cards (typically 56 cards), wherein each card 1 is within the ISO card size standard, namely about 2"×3.5".

In an exemplary embodiment, certain compounds are printed over the surface of sheets 10 and 12. The compounds may be printed in accordance with accepted ISO standards. One skilled in the art will appreciate that the printing of the text 30 and logo 50, and optically recognizable ink may be applied to any surface of card 1 such as, for example, the front 10 face (front material layer 10), the rear 12 face (rear material layer 12), the inside or outside surface of either face, between the two sheets of base material and/or a combination thereof. Moreover, any suitable printing, scoring, imprinting, marking or like method is within the scope of the present invention.

The text 30 and logo 50 are printed on the outside surface of each material layer 10, 12 by a known printing process, such as an offset printing process, which provides a thinner ink coverage, but clearer text. More particularly, with respect to offset printing, the artwork is duplicated onto a metal plate and the metal plate is placed onto an offset press printing machine which can print up to four colors during a single run. The offset printed text may include, for example, a corporate name, a copyright/trademark/patent notice, a batch code number, an "active thru" date, contact telephone numbers, legal statements and/or the like. The exemplary offset text may be printed in 4DBC in opaque white ink or a special mix of Pantone Cool Gray 11 called UV AMX Gray. In one exemplary embodiment, the offset printed text is printed directly on the RF module 20, such that the text is visible on the module 20 through casual inspection.

A laminate material layer 15 is applied to the back layer 12 of card 1. In one preferred embodiment, the laminate layer 15 includes rows of ISO compliant magnetic stripes 40, wherein each magnetic stripe 40 corresponds to an individual card 1. The magnetic stripe 40 may extend along one length of the card 1 and is applied to the back surface 12. The magnetic stripe 40 may be any width, length, shape, and placed on any location on card 1. In an exemplary embodiment, the magnetic stripe 40 is applied to the outer laminate layer 15 using a tape layer machine which bonds the cold peel magnetic stripe 40 to the outer laminate 15 when it is in a rolled position (not shown). The laminate 15 roll with a rolling hot die and at suitable pressure. The roll is then cut into layers 10, 12 before the card layers are assembled.

After the desired printing is complete and the magnetic stripe applied, the front 10 and back 12 material layers are placed together, and the layers are preferably adhered together by any suitable adhering process, such as a suitable adhesive. One skilled in the art will appreciate that, instead of printing on two material layers and combining the two material layers, a single plastic material layer can be used, wherein the single material layer is printed on one side, then the same material layer is re-sent through the printer for printing on the opposite side.

In the present invention, after adhering the layers together, a layer of lamination (not shown), approximately the same dimensions as the plastic sheets, namely 3'×4', may be applied over the front 10 and back 12 of card 1. After the laminate is applied over the front 10 and back 12 of the combined plastic material layers, card 1 layers are suitably compressed at a suitable pressure and heated at about 300 degrees, at a pressure of between 90–700 psi, with a suitable dwell time to create a single card 1 device. The aforementioned card fabrication can be completed by, for example, Oberthur Card Systems, 15 James Hance Court, Exton, Pa.

In an exemplary embodiment, the card layers 10 and 12 are fused together in a lamination process using heat and pressure. During the hot press phase, the press is heated to about 300 F. degrees and the pressure builds to about 1000 psi and holds for about 90 seconds. The pressure then ramps up to about 350 psi over an about 30-second period and holds for 16 minutes at the same temperature, namely 300° F. degrees. The sheet 200 is then transferred to a cold press which is at about 57° F. degrees. The pressure builds to about 400 psi and is held for about 16 minutes as chilled water of about 57° F. degrees is circulated in the plates. The cold press then unloads the sheet 200.

In one exemplary manufacturing embodiment, the cards 1 may include internal circuitry for use in completing contactless transactions. For example, card 1 may include a RF module 20 included in the card body and preferably may be included in subassembly sheet 21. The RF module 20 is preferably positioned substantially central to the card body but may be positioned at any desired location therein. The RF module 20 may be included interposed between front surface material layer 10 and back surface material layer 20 during fabrication of the sheet 200. Specifically, the module 20 may be included interposed between at least two layers of the subassembly sheet 20. Alternatively, after lamination, the RF module 20 may be included within an individual card 1 within a space created by milling the card body and providing room for the insertion of the RF module 20. As such, upon including the RF module 20, sheet 200 will comprise a plurality of RF operable transaction cards 1 wherein each transaction card 1 includes a RF module 20. Traditional methods for including RF module 20 in transaction devices 1 are well known, and are intended to be within the scope of the invention.

Figure 6:
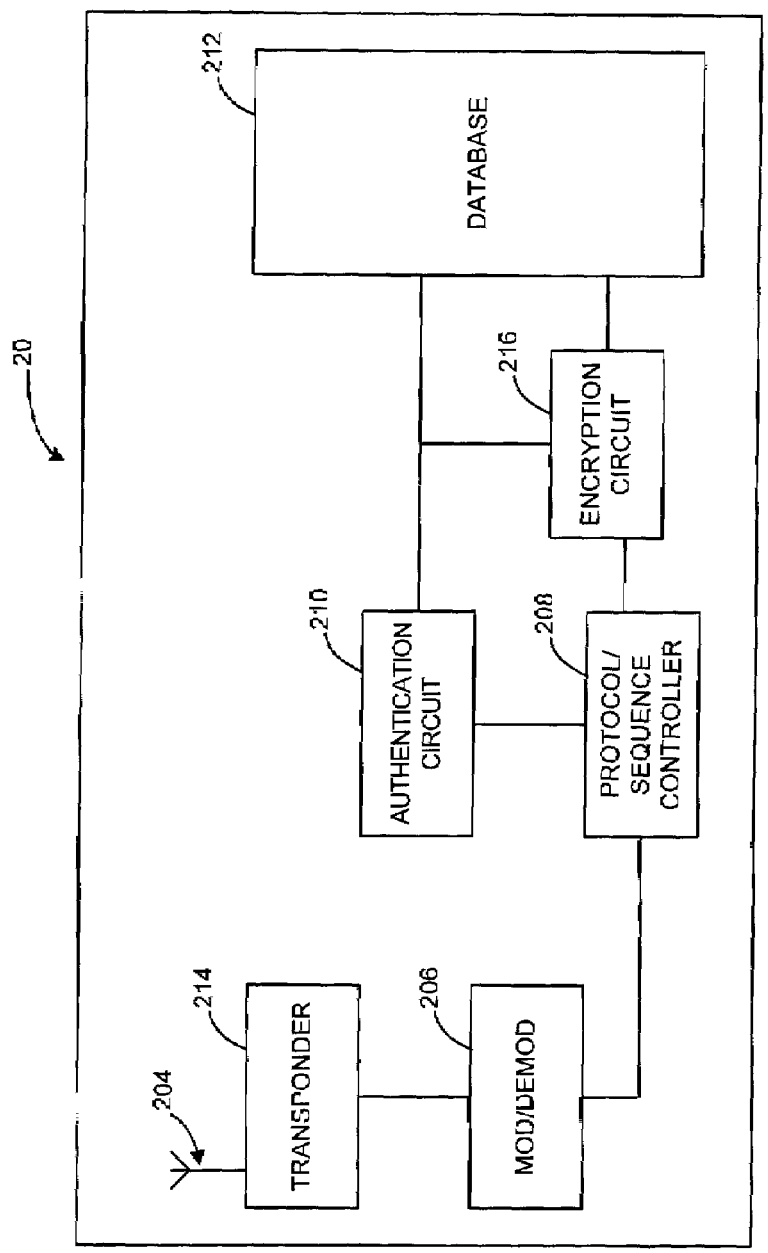
FIG. 6 shows an exemplary RF module in accordance with an exemplary embodiment of the present invention.

FIG. 6 illustrates a block diagram of the many functional components of an exemplary RF module 20 in accordance with the present invention. Module 20 may include any conventional RF circuitry capable of communicating via Radio Frequency transmission. A suitable module 20 may be presented by the user to facilitate an exchange of funds or points, etc., for receipt of goods or services.

RF module 20 may include an antenna 204 for receiving an interrogation signal from RFID reader 104 via antenna 106 (or alternatively, via external antenna 108). Module antenna 204 may be in communication with a transponder 214. In one exemplary embodiment, transponder 214 may be a 13.56 MHz transponder compliant with the ISO/IEC 14443 standard, and antenna 204 may be of the 13 MHz variety. The transponder 214 may be in communication with a transponder compatible modulator/demodulator 206 configured to receive the signal from transponder 214 and configured to modulate the signal into a format readable by any later connected circuitry. Further, modulator/demodulator 206 may be configured to format (e.g., demodulate) a signal received from the later connected circuitry in a format compatible with transponder 214 for transmitting to RFID reader 104 via antenna 204. For example, where transponder 114 is of the 13.56 MHz variety, modulator/demodulator 206 may be ISO/IEC 14443-2 compliant.

Modulator/demodulator 206 may be coupled to a protocol/sequence controller 208 for facilitating control of the authentication of the signal provided by RFID reader 104, and for facilitating control of the sending of the module 20 account number. In this regard, protocol/sequence controller 208 may be any suitable digital or logic driven circuitry capable of facilitating determination of the sequence of operation for the module 20 inner-circuitry. For example, protocol/sequence controller 208 may be configured to determine whether the signal provided by the RFID reader 104 is authenticated, and thereby providing to the RFID reader 104 the account number stored on module 20.

To authenticate the signal, the protocol/sequence controller 208 may be further in communication with authentication circuitry 210 for facilitating authentication of the signal provided by RFID reader 104. Authentication circuitry may be further in communication with a non-volatile secure memory database 212. Secure memory database 212 may be any suitable elementary file system such as that defined by ISO/IEC 7816-4 or any other elementary file system allowing a lookup of data to be interpreted by the application on the chip. Database 212 may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. Database 212 may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The data received from the reader 104 or the database 212 may be used by protocol/sequence controller 208 for data analysis and used for management and control purposes, as well as security purposes. Authentication circuitry 216 may authenticate the signal provided by RFID reader 104 by association of the RF signal to authentication keys stored on database 212. Authentication circuitry 216 may be in further communication with an encryption circuitry 216 which may encrypt or decrypt the reader 104 signal or the data (e.g., account number, user identifier, device identifier, etc.) returned from database 212 prior to transmitting the data. Encryption circuitry 216 may use keys stored on database 212 to perform encryption and/or decryption of signals sent to or from the RFID reader 104.

In addition, protocol/sequence controller 208 may be in communication with a database 212 for storing at least one of a module 20 account data, a unique module 20 identification code, user identification code, or transaction device identifier. Protocol/sequence controller 208 may be configured to retrieve the account number from database 212 as desired. Database 212 may be of the same configuration as database 212 described above. The account data and/or unique device identification code stored on database 212 may be encrypted prior to storage. Thus, where protocol/ sequence controller 208 retrieves the account data, and or unique transaction device identifier, or the like, from database 212, the data may be encrypted by the encryption circuit 216 when being provided to RFID reader 104. Further, the data stored on database 212 may include, for example, an unencrypted unique module 20 identification code, a user identification ISO/IEC, Track 1 and 2 data, as well as specific application applets. The data may additionally be stored in the database 212 in Track 1/Track 2 format and may also be in Track 1/Track 2 format when provided to the reader 104

In one exemplary embodiment, module 20 antenna 218 may be 134 KHz rated configured to communicate with a 134 KHz transponder 214. In this exemplary configuration, an ISO/IEC 14443-2 compliant modulator/demodulator 206 may not be required. Further still, reader 104 may also include an antenna 106, 108 and a transponder modulator which is also ISO/IEC 1443-2 complaint to ensure successful RF communication with correspondent components at module 20.

In an exemplary operation, the module 20 is placed in proximity to reader 104 when the user wishes to conduct a transaction. The user simply waves the module 20 at a certain distance from the RF-based reader 104 until the reader 104 acknowledges that the information contained in the RF module 20 has been received. The RF-based reader 104 then utilizes at least a portion of the information provided by module 20 (such as, a user's account number associated with the transaction device) to complete the transaction. The reader 104 may receive the account information from the module 20 and verify the account information authenticity prior to forwarding the account information to merchant system 130. Alternatively, the reader 104 may forward the account information to a merchant system 130 (via the merchant system POS 110) which may provide the account information to a transaction device issuer system (via network 112) for transaction completion. The merchant system 130 forwards the account information to an account issuer system, which may complete the transaction under issuer defined business as usual protocol. Exemplary transaction completion methods and transaction device components are disclosed in the commonly owned U.S. patent application Ser. No. 10/192,488, entitled "SYSTEM AND METHOD FOR PAYMENT USING RADIO FREQUENCY IDENTIFICATION IN CONTACT AND CONTACTLESS TRANSACTIONS," filed on Jul. 9, 2002, incorporated herein in its entirety.

With reference to FIG. 3, after the card sheet 200 is prepared, including the RF module 20, the sheets may be cut into individual cards 1 by a known stamping process, including any necessary curing, burrowing, heating, cleaning and/or sealing of the edges. The individual transaction cards 1 are about 2"×3.5" and conform to ISO standards for transaction card 1 shape and size. As used hereinafter, the transaction card 1 is termed the transaction device "transporter," since the transaction device issuer may provide the RF module 20 to a user when the module 20 is still affixed to the transporter 1 as described below.

In an exemplary embodiment, the laminated sheet 200 of 56 transaction device transporters 1 (including the RF module) are suitably cut in half on a guillotine device, resulting in two half-sheets of 28 transporters 1 and module 20 combinations. The half-sheets may be loaded onto any conventional card punch machine which aligns the sheets to a die (x and y axes) using predetermined alignment marks 202 visible to the optics of the machine. The half-sheets are then fed under a punch to punch out the desired transporter device 1 and module 20 (called "transaction device combination") shape. Particularly, a fixed distance feed is followed by another optic sensor search to stop the feed at the preprinted alignment mark, then the machine punches a row of four transaction device combinations out at one time, each punch being made along a preprinted alignment mark 202.

The preprinted alignment marks 202 indicate the perimeter boundaries of each transaction device transporter 1 to be cut from sheet 200. To separate each transaction device combination from the other, the cuts may typically be made along the preprinted alignment marks 202. In general, the preprinted alignment marks 202 are included in the sheet 200 as the writing is being added to the device material layers 10, 12. A typical sheet 200 may yield over 50 transaction device combinations (typically 56). In general, the shape of the transporter 1 is kept consistent by using a cutting apparatus having a preformed cutting dye formed in the desired shape. For example, the cutting dye may be formed in any shape, such as, for example, a traditional credit card shape as shown in FIG. 1. Alternatively, the shape is cut by using, for example, a laser or other cutting apparatus guided by any suitable preprinted alignment marks 202. The resulting individual transaction device combination may then be distributed for immediate activation and use.

Conventional methods of fabricating, manufacturing and cutting transaction devices, such as, credit cards, smart cards, RF key fobs are well known. As such, one skilled in the art will understand the machinery and processes for fabricating, manufacturing, and/or cutting as they are included in the scope of this invention. Indeed, in the interest of brevity, conventional methods of fabricating, manufacturing and cutting transaction devices will not be discussed in detail herein. For instruction on manufacturing and fabricating a typical transaction card, see U.S. patent application Ser. No. 10/092,681, entitled "TRANSACTION CARD," filed Mar. 7, 2002, and incorporated herein in its entirety.

While the foregoing describes an exemplary embodiment for the fabrication of transaction device combination, one skilled in the art will appreciate that any suitable method for incorporating text 30, logos 50, a magnetic stripe 40, a signature field, holographic foil 15 onto a substrate in accordance with accepted 160 standards, is within the scope of the present invention. Moreover, the holographic foil, RF module 20, logo 50, magnetic stripe 40, signature field or any other compound may be included on the transporter 1 by any suitable means such as, for example, heat, pressure, adhesive, grooved and/or any combination thereof. In accordance with one embodiment, the text 30, logo 50, magnetic stripe 40, or holographic foil 15 may additionally be included in one surface use of the module 20 on a portion easily viewable by casual inspection.

Figure 7:
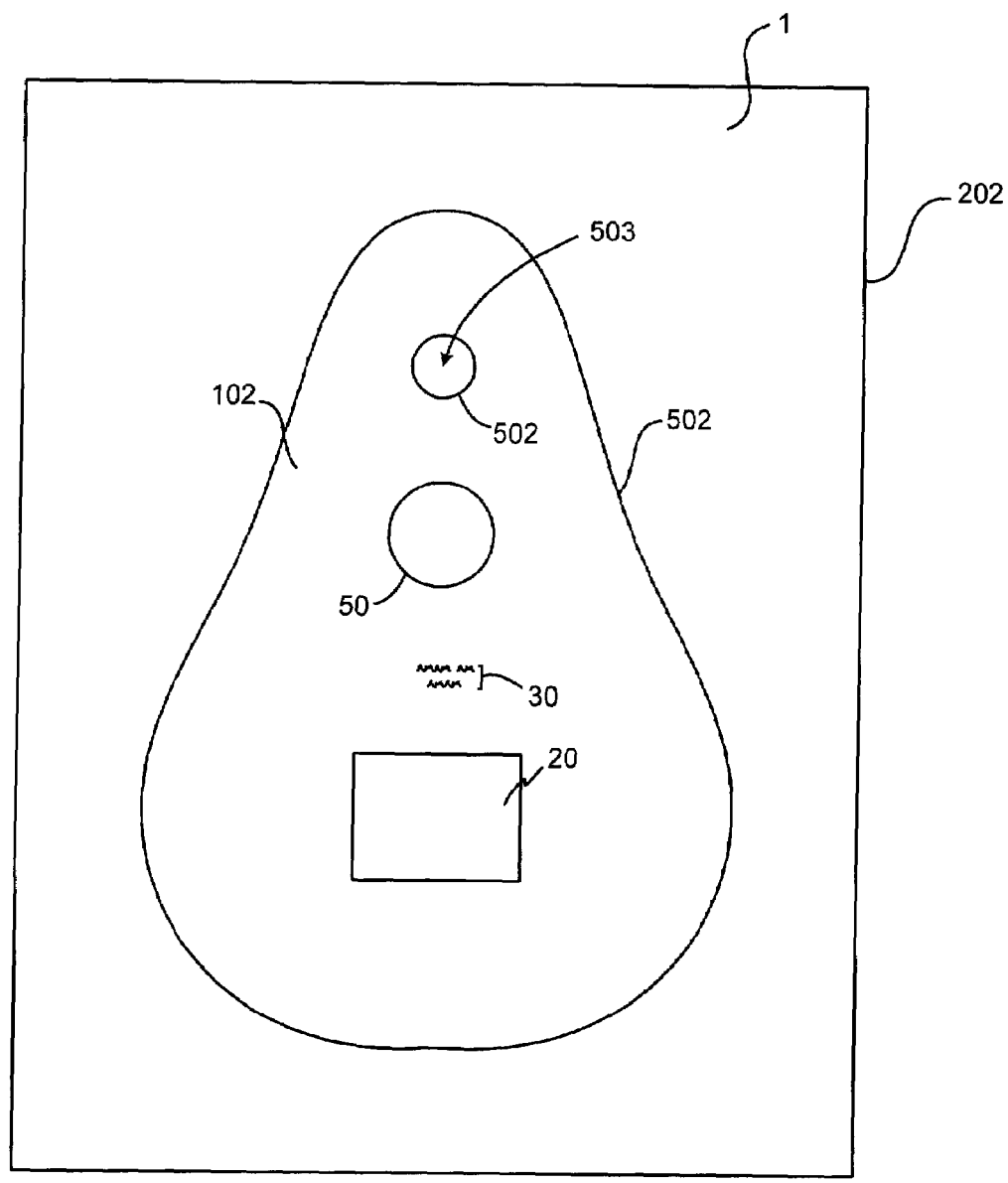
FIG. 7 depicts the front surface of an exemplary RF transaction device combination in accordance with an exemplary embodiment of the present invention.

As noted, various card manufacturers are producing RF transaction devices that are irregularly shaped. As such, the irregular shaped transaction devices are typically cut using a cutting dye, or other method discussed above, which is designed to cut a sheet 200 into the desired transaction device shape. Consequently, manufacturers must often retrofit their machinery to cut the irregular shape. Returning now to FIG. 5, a teardrop shaped RF transaction device (key fob) 500 is shown. To provide transaction devices of similar shape as device 102, a card manufacturer may typically use a cutting machine including a teardrop shaped cutting dye, or a cutting means guided by the preprinted device 102 alignment marks 502 (also shown in FIG. 7). As can be seen, the RF transaction device 102 may include a logo 50.

Figure 8:
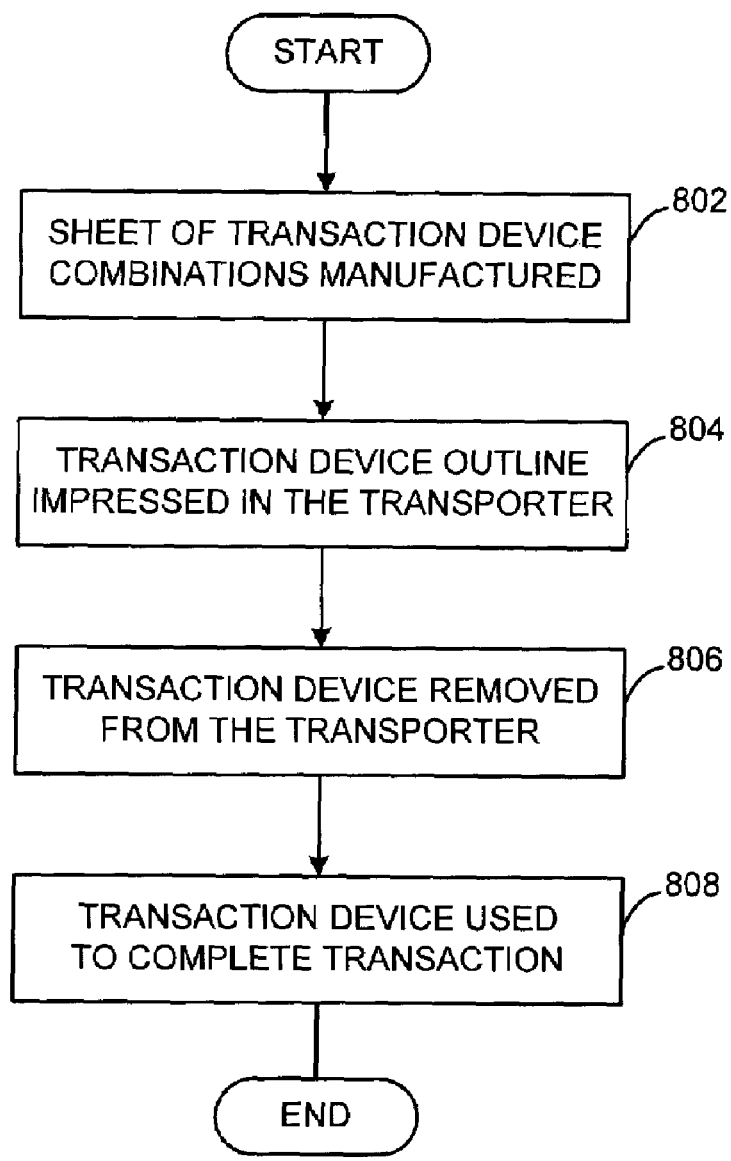
FIG. 8 illustrates an overview of an exemplary method for providing a transaction device to an end user in accordance with exemplary embodiments of the present invention.
Figure 9:
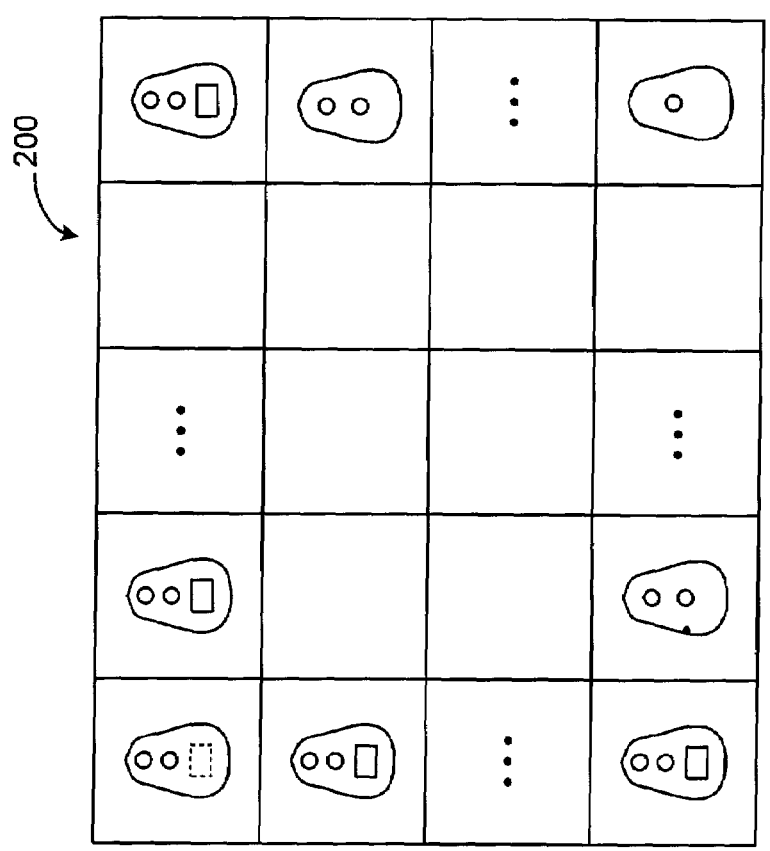
FIG. 9 shows an exemplary sheet of a plurality of cojoined transaction device combination each including a RF transaction device, therein, in accordance with an exemplary embodiment of the present invention.

In accordance with one aspect of the invention, a credit card manufacturer may provide an irregularly shaped RF transaction device 102 using a manufacturing process that is coextensive with the manufacturing process used for traditional transaction card 1 shapes. That is, the transaction devices 102 and transporters 1 may be manufactured, cut, perforated, or impressed without need to manufacture the devices independently of the transporter 1. FIG. 8 depicts an exemplary overview of any transaction device combination manufacturing method according to the invention. As shown in FIG. 8, and with continued reference to FIG. 7, a transaction device sheet 200 (shown best in FIG. 9) including a plurality of conjoined RF transaction device combinations 1 is provided using any of the manufacturing methods discussed herein (step 802). The transporter 1 may include an outline of irregularly shaped transaction devices 102 defined by alignment marks 502. Alignment marks 502 may ordinarily be imprinted and pressed within the outline of the transporter 1 defined by the preprinted alignment marks 202. The sheet 200 may be prepared using conventional RF transaction device and transaction card fabricating methods. The outline of the irregular shaped removable RF transaction device 102 which is shown as preprinted alignment marks 502 in FIG. 7, may be pressed into, and contained substantially inside, the preprinted alignment marks 202 of the transporter 1 (step 804). The alignment marks 502 may be pressed into the surface of the transponder and substantially therethrough. In one embodiment, the alignment marks 502 are pressed into the surface of the transporter 1 such that the transporter 1 and transaction device 102 are in physical contact. However, the irregular shaped removable RF transaction device 102 may then be removed from (i.e., "punched out" of) the transporter 1 by using minimal physical force at preprinted alignment marks 202 (step 806). The resulting RF transaction device 102 may then be used in completing a RF transaction under any merchant or account provider business as usual standards (step 808).

To assist in punching out or removing the transaction device 102, the RF transaction device 102 preprinted alignment marks 502 may be pressed into the body of transporter 1 defined by preprinted alignment marks 202. As noted, the transporter 1 may be formed with one or more material layers, such as, for example, front layer 10, and back layer 12. The pressing action may result in indentations, or perforations being impressed into or through one or more layers of the multilayer transaction device. However, the perforations or indentations may not traverse completely through the card body. Instead, the perforations or indentations are impressed at such sufficient depth to permit the transaction device 102 to be removed from the transporter 1 with the application of minimal physical force. Thus, the perforations or indentations are typically provided along the transaction device 102 preprinted alignment marks 502 to facilitate the removal of the transaction device 102 from the transporter body. In one exemplary embodiment, the perforations and indentations, which may be used to form the outline of the transaction device 102, may also be arranged to form an outline of a shape, a picture, a security enhancing visage, or the like as desired by the manufacturer or system user. Suitable methods for providing perforations are disclosed in U.S. patent application Ser. No. 10/288,945, entitled "PERFORATED TRANSACTION CARD," filed Nov. 6, 2002, incorporated herein by reference in its entirety.

Figure 10:
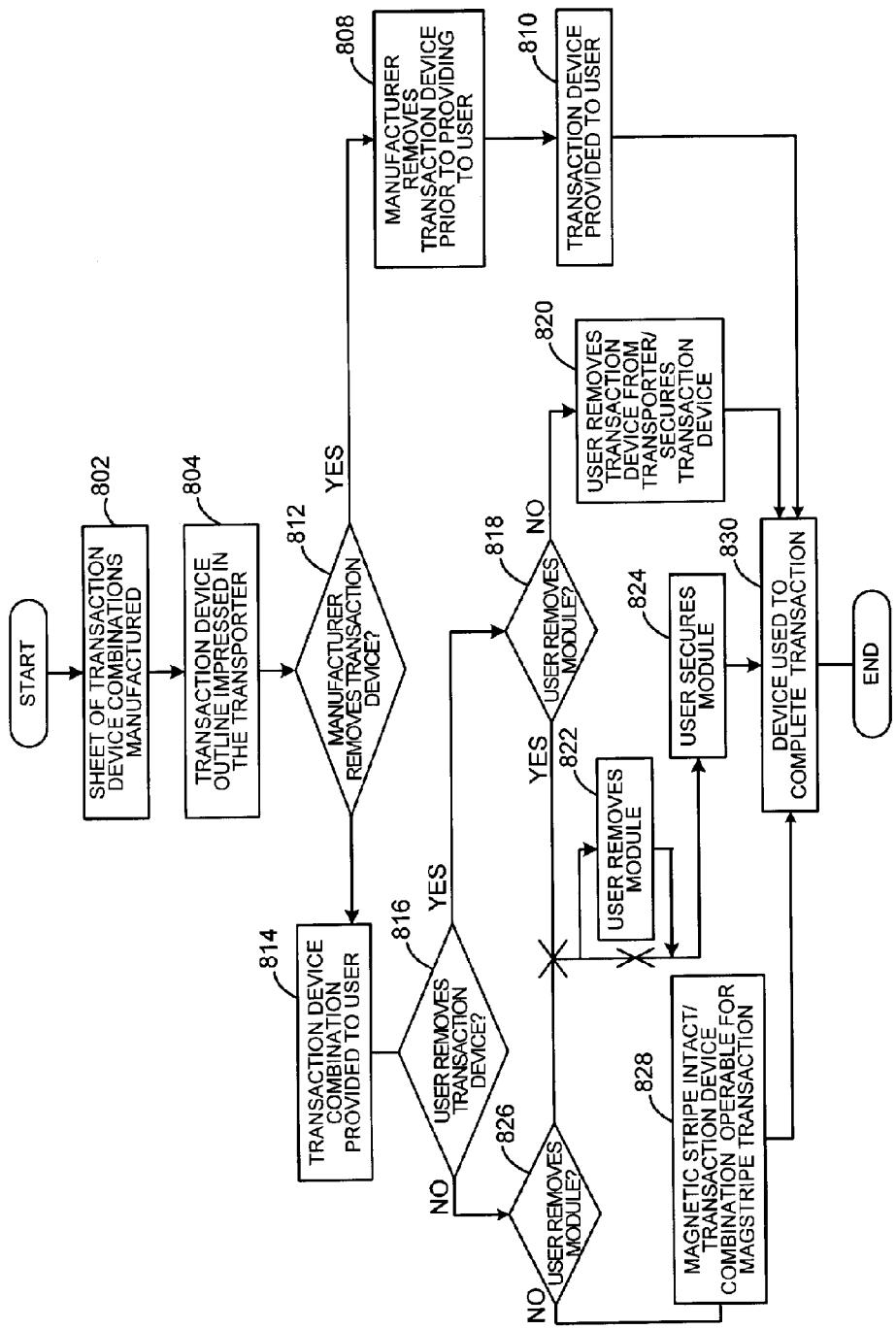
FIG. 10 is an exemplary detailed flowchart of an exemplary method for providing a transaction device to an end user in accordance with exemplary embodiments of the present invention.

FIG. 10 illustrates various exemplary embodiments of a method for providing to a user RF transaction device 102 which may be removed from a transporter 1. In accordance with step 802, each exemplary embodiment begins with the fabrication of a multilayer sheet 200 of a plurality of conjoined transaction device combinations.

In accordance with one exemplary embodiment of the present invention, the transaction device 102 outline (lines 502) is impressed within the outline of the transporter 1 drawn by alignment marks 202. For example, the preprinted sheet 200 of transaction device combinations is provided with the transporter 1 alignment marks 202 preprinted on the combination's front or rear surface 10, 12, and the transaction device outline 502 ("alignment marks 502") is impressed within the alignment marks 502 (step 804).

Once the impression of the transaction device 102 is made in the transporter 1, the transaction device manufacturer may remove the transaction device 102 from the transporter 1 and provide the transaction device 102 to an end user. In one exemplary embodiment, the transaction device 102 is removed from the transporter 1 by the manufacturer (step 808) prior to providing the transaction device 102 to a user for device activation and device usage (step 810). In this way, the transaction device 102 may be provided to a user independent of the transporter 1. The user may use the transaction device 102 to complete a transaction by placing the transaction device 102 in proximity to the reader 104 as described above (step 830).

In an alternate embodiment of the invention, the RF transaction device 102 is not removed by the manufacturer, but instead the RF transaction device 102 is removed from the transporter 1 by the end user (step 812). For example, a transaction device provider may provide a user with the transaction device combination, including the transporter 1, and the transaction device 102, which includes RF module 20 (step 814). The user may then decide whether to remove the transaction device 102 from the transporter 1, which may be removed at the user's leisure (step 816). Should the user remove the transaction device 102, the user may additionally decide whether to remove module 20 (step 818). The user may remove the transaction device 102 to complete a transaction independent of the transporter 1 (step 830). The user may remove the transaction device 102 from transporter 1 by applying minimal physical force at the transaction device outline 502. The transaction device 102 may be removed manually or by cutting, tearing, or the like, (step 820). The user may use the transaction device 102 by placing the transaction device 102 in proximity to reader 104, as described above (step 830). The RF module 20 may then provide transaction device account information to a RFID reader 104 for transaction completion.

The transaction device 102 may include an aperture 503, which may be formed by pressing the shape of the aperture 503 in the transporter 1 along alignment lines 502, perforating the transaction device 102 shape in the transporter 1 using any conventional machinery or method as described above. The aperture 503 may then be punched out or removed, wherein the portion of the transporter 1 within the aperture 503 is removed leaving an opening therein. The transaction device 102 may then be secured to a user's person or often used personal article by inserting one end of a tether-like means (not shown) through aperture 503 and securing the other end of the tether-like means to a transaction device 102 user person or often used personal article (e.g., keychain, fob chain, key ring, string, strap, belt, rope, etc.) which is ordinarily easily portable (step 820). The user may then use the transaction device 102 in similar manner as discussed above (step 830).

Figure 11:
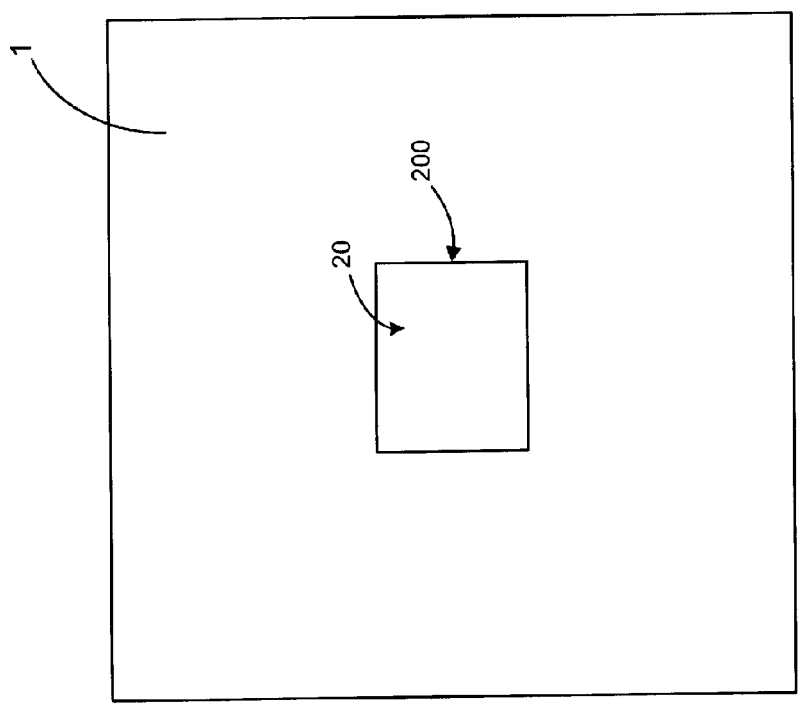
FIG. 11 depicts an exemplary transporter and RF module combination in accordance with the present invention.

In another exemplary embodiment of the invention, user or transaction device manufacturer may remove the RF module 20 from the transporter 1 to enable use of the module 20 to complete a transaction independent of any other portion of the transporter 1 or the transaction device 102 (step 822). In this instance, the transaction device issuer may configure the stamping machinery to preprint alignment marks which closely mimic the shape of the module 20. As shown in FIG. 11, the transporter 1 may include a square shaped module 20 including alignment marks 220. In similar manner as previously described, the issuer may perforate the transporter 1 along the alignment marks 220 to facilitate easy removal of the module 20 from the transporter 1 by the user or the issuer. The module 20 outline may be pressed substantially, but not completely, through transporter 1 body. In this way, the user may remove module 20 from transporter 1 with minimal physical force (step 822). The user may then use the module 20 to complete a RF transaction by positioning the module 20 in proximity to the reader 104 in similar manner as was described with the transaction device 102 (step 830).

Figure 12:
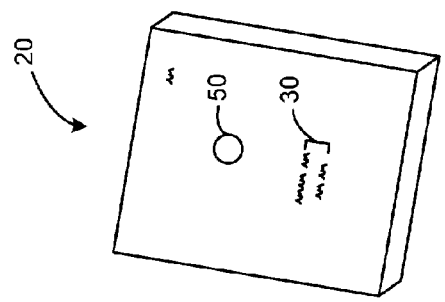
FIG. 12 depicts an exemplary RF module removed from a transporter in accordance with the present invention.

FIG. 12 shows the RF module 20 removed from the transporter 1. As shown, the module 20 may include the offset printed text described above (e.g., logo, text 30, logo 50, active through date, telephone numbers, etc.), which is perceptible to the casual observer by visual inspection. The module 20, may be a self-contained device in that the module may be used to complete transactions irrespective of the transporter 1. In exemplary embodiment, the module 20 may be of sufficient size that it is easily punched out or removed from the transporter 1. For example, the module may be 1×1 9/16", although other suitable sizes are contemplated.

In one exemplary embodiment, the user may use the module 20 with any portable form factor configured to secure the module 20 during transaction completion (step 824). In one embodiment, the form factor is embodied in an article frequently used by the module user. For example, the module 20 may be secured to any portable apparatus which may be manually transported by the module 20 user, and which may be used to facilitate manually presenting the module 20 to a RFID reader 104 for transaction completion. A suitable portable apparatus may include means for securing the module 20 to the apparatus.

Figure 13:
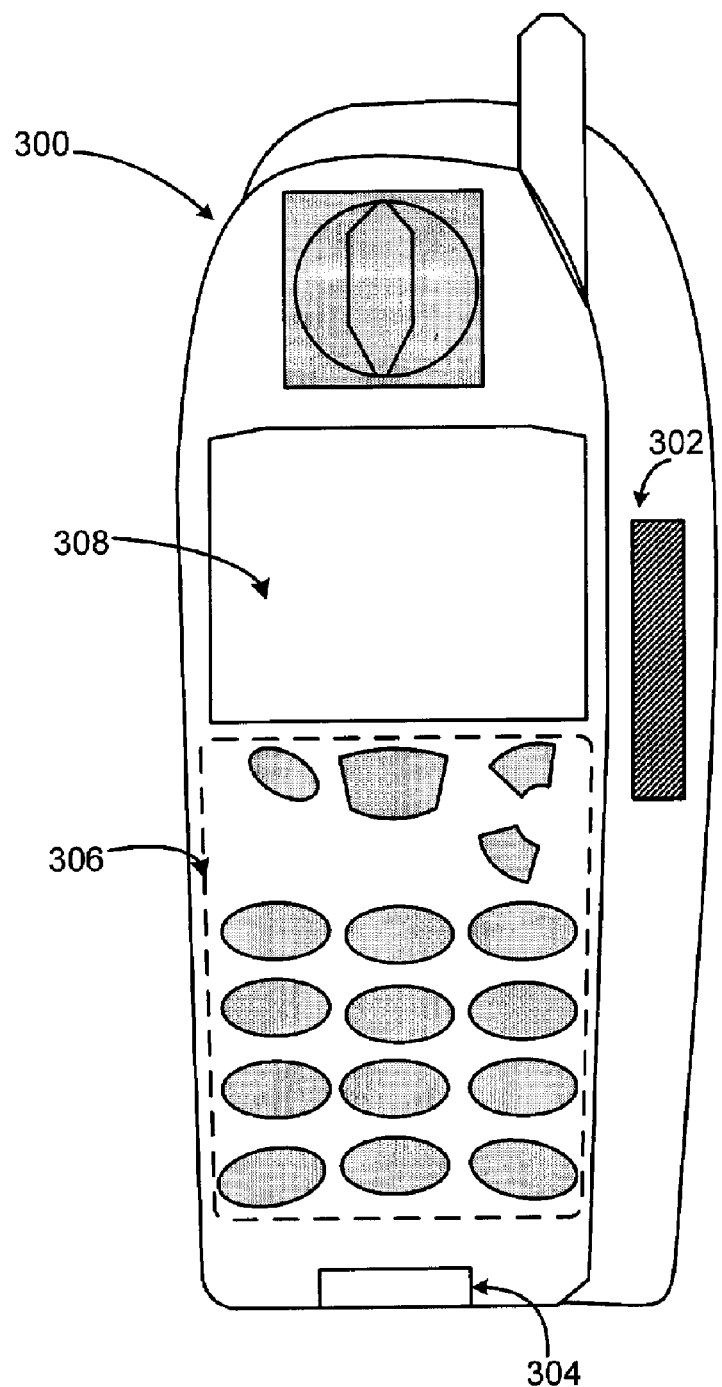
FIG. 13 depicts an exemplary embodiment of a suitable frequently used portable form factor comprising a recess for including a RF module in accordance with the present invention.

FIG. 13 shows an exemplary apparatus for securing and presenting the module 20 for transaction completion which may be used in accordance with the present invention. As shown, the apparatus may be a nontraditional transaction device, such as, a conventional cellular phone 300 although any portable form factor including a microprocessor may be used. For example, the apparatus may be a personal digital assistant (PDA), mini personal computer or the like. The cellular phone 300 may include a recess 302 which may be configured to accept the module 20 therein. The recess 302 may be included in one surface of the phone 300 at sufficient depth to substantially recess the RF module 20 therein, to secure the module 20. The recess 302 may further be configured to hide the RF module 20 from view. The module 20 may thereby be inserted in the recess 302 and secured by any fastening means such as clips, molded clips and fittings, screws, glue, soldering or the like. The module 20, may be inserted into the recess 302 of the cellular phone 300 prior to providing the phone 300 to the user. Alternatively, the module 20 may be provided to the user in a transaction device combination, and the module may be removed from the transporter 1 and the transaction device 102 and inserted in the recess 302 by the user. Further still, the module 20 may be provided to the user in the transporter 1 or the transaction device 102, and the user may remove the module 20 at the user's leisure.

Figure 14:
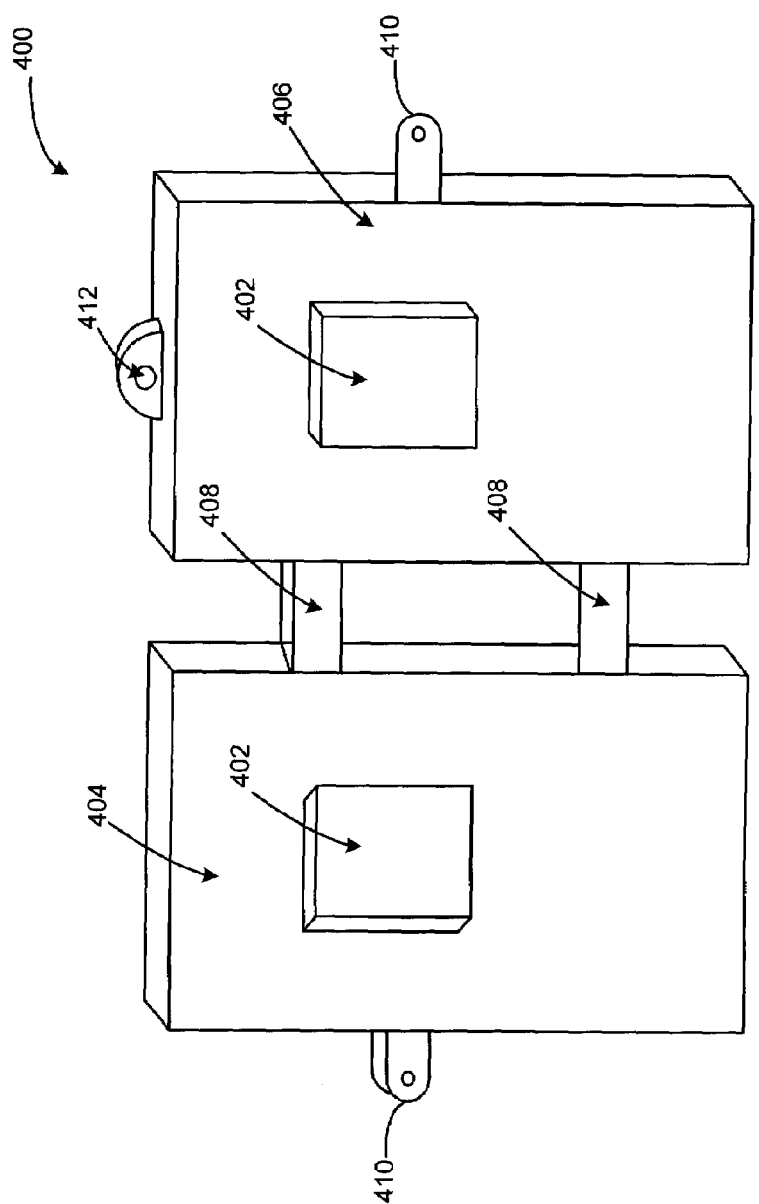
FIG. 14 depicts an exemplary RF module carrier in accordance with the present invention.

In yet another exemplary embodiment, as shown in FIG. 14, a portable carrier 400 may be provided to the user for securing the module 20 during transaction completion. Carrier 400 may be of any desired shape but may be of sufficient size to substantially enclose the module 20 in use. The carrier 400 may be constructed of any durable or sturdy material such as metal, plastic, composite materials or the like. The carrier 400 may additionally be transparent or translucent to permit casual viewing of the module 20 when the module 20 is secured therein.

For example, in the embodiment shown, carrier 400 is of similar shape as the module 20 depicted in FIG. 12 (e.g., square), although the carrier 400 may take any shape. In one embodiment, the carrier 400 may be dimensionally larger than the module 20 to ensure that the module may be enclosed therein although any carrier 400 shape or size may be used. The carrier 400 may include a recess 402 in which the module 20 may be snuggly fitted. The carrier 400 may include a first 404 and second 406 carrier door. First 404 and second 406 carrier door may include the recess 402 included in one panel of each door. The recess 402 forms a cavity when the doors 404, 406 are positioned one on the other. The module 20 may be secured in the cavity. The doors 404 and 406 may be in communication along one side by hinges 408, which permit the doors 404, 406 to be closed one on top of the other with the module 20 interposed in between. The doors 404, 406 may be secured one to the other by the hinges 408 and a suitable latch 410 configured to ensure that the doors 404, 406 remain fastened one to the other and the module 20 remains inside the carrier 400 during transaction completion.

Carrier 400 may further include an aperture 412 in at least one end of the door 404, 406. The aperture 412 may be used in similar manner as with aperture 503 of FIG. 7. That is, the carrier 400 (which may include the module 20) may be secured to a user's person or to an apparatus the user frequently handles.

Alternatively, the carrier may be secured to the apparatus, such as cell phone 300 using any suitable attachment method. For example, the carrier 400 including the module 20 may be fastened to the cell phone 300 using any attachment means, such as for example, screws, rivets, bonding compound, glue or especially made fastening construction operable to hold the carrier 400 in physical communication with the cell phone 1402. For example, one suitable attachment method may be the fastener described in U.S. Pat. No. 6,669,263, entitled "Attachment Device," which issued December 30, 2003, to Asai, and U.S. Pat. No. 6,643,076, entitled "Attachment Device," which issued Nov. 4, 2003, to Montage, hereby incorporated by reference.

Figure 15:
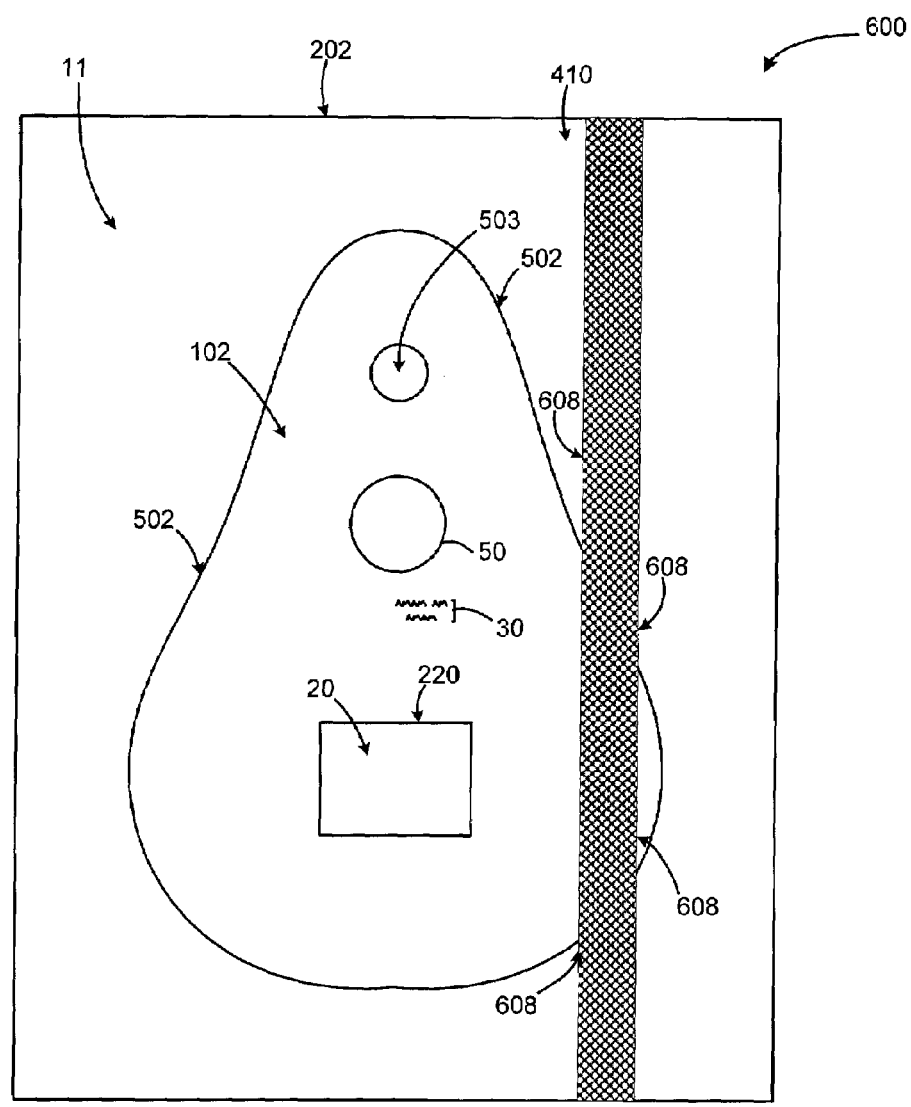
FIG. 15 depicts a transaction device combination including a magnetic stripe in accordance with exemplary embodiments of the present invention.

Returning now to FIG. 8, in yet another exemplary method, the user may not wish to remove the module 20 or the transaction device 102 from the transporter 1 (steps 816 and 826). Instead, the user may wish to use the transaction device combination to complete a transaction. That is, the transaction device combination may be used with the module 20 and the transporter 1 intact. FIG. 15 shows an exemplary depiction of a transaction device combination 600 in accordance with the present invention which may be used to complete a transaction. FIG. 15 depicts a transaction device combination 600 which includes a transporter 1 and a RF module 20. The combination 600 may further include the impression of the transaction device 102 although not required. For example, the transporter 1 may include alignment lines 502 which trace a shape of a transaction device 102 including the RF module 20 the shape of which may be formed from impressed alignment lines 220. Perforations may be made along the alignment lines 502, 220 which trace at least one of the shape of transaction device 1508 or the module 20.

The transporter 1 may be configured with a magnetic stripe 40 using any conventional method for attaching magnetic stripes as is commonly known. The magnetic stripe 40 may be compliant to International Standard Setting Organization standards for the shape, location and the format of the data stored and retrieved from the magnetic stripe 40. The magnetic stripe 40 may be configured to include account data (e.g., account, user, or transaction device identifier, code or number) stored thereon in Track 1/Track 2 ISO magnetic stripe standard format. As such, the magnetic stripe 40 may be configured to be readable by any conventional magnetic stripe reader as is found in the art. Consequently, the user may use the transaction device combination 600 in similar manner as a traditional credit, debit, DDA, prepaid card, an the like. For example, the user may present the transaction device combination 600 to a magnetic stripe reader, which may retrieve the magnetic stripe 40 data and forward the data to an account issuer for transaction completion. Conventional methods for completing a transaction are well known and will not be repeated for brevity.

Figure 16:
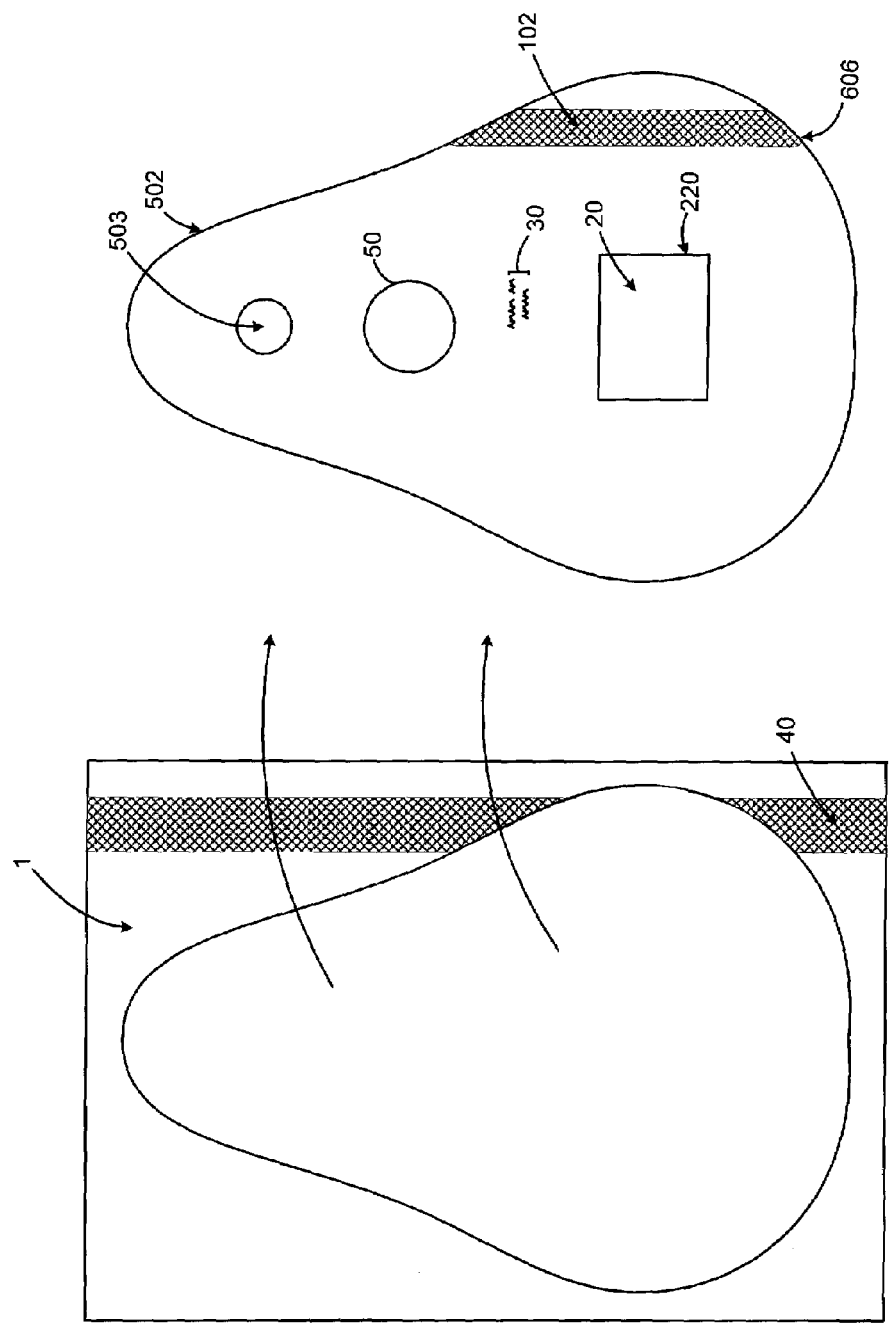
FIG. 16 depicts a transaction device combination with the transaction device removed in accordance with exemplary embodiments of the present invention.

In one conventional construction of transaction device combination 600, the magnetic stripe 40 may be such that a portion of the alignment lines 502, including the impressed outline of the transaction device 102 may intersect the magnetic stripe 40, as shown in FIG. 15 at character reference 608. In this way, the transaction device 102 outline overlaps the magnetic stripe 40. As such, the transaction device 102 including module 20 may be removed from the transporter 1 and a portion of the magnetic stripe 40 is removed therewith as shown in FIG. 16. In this way, the user ensures that the transporter 1, including the remaining portion of the magnetic stripe 40, may not be used to complete transactions. This is true, since the magnetic stripe 40 will have a portion 606 of the magnetic stripe 40 removed when the device 102 is removed, thereby making the magnetic stripe 40 inoperable for transmitting complete magnetic stripe information. That portion 606 of the magnetic stripe 40, which is removed, may ordinarily be included as a portion of the transaction device 606 to ensure that the magnetic stripe 40 may be disabled when the transaction device 102 is removed. Once removed, the transaction device 102, or the module 20 may be used to complete a transaction in similar manner as was discussed above.

Figure 17:
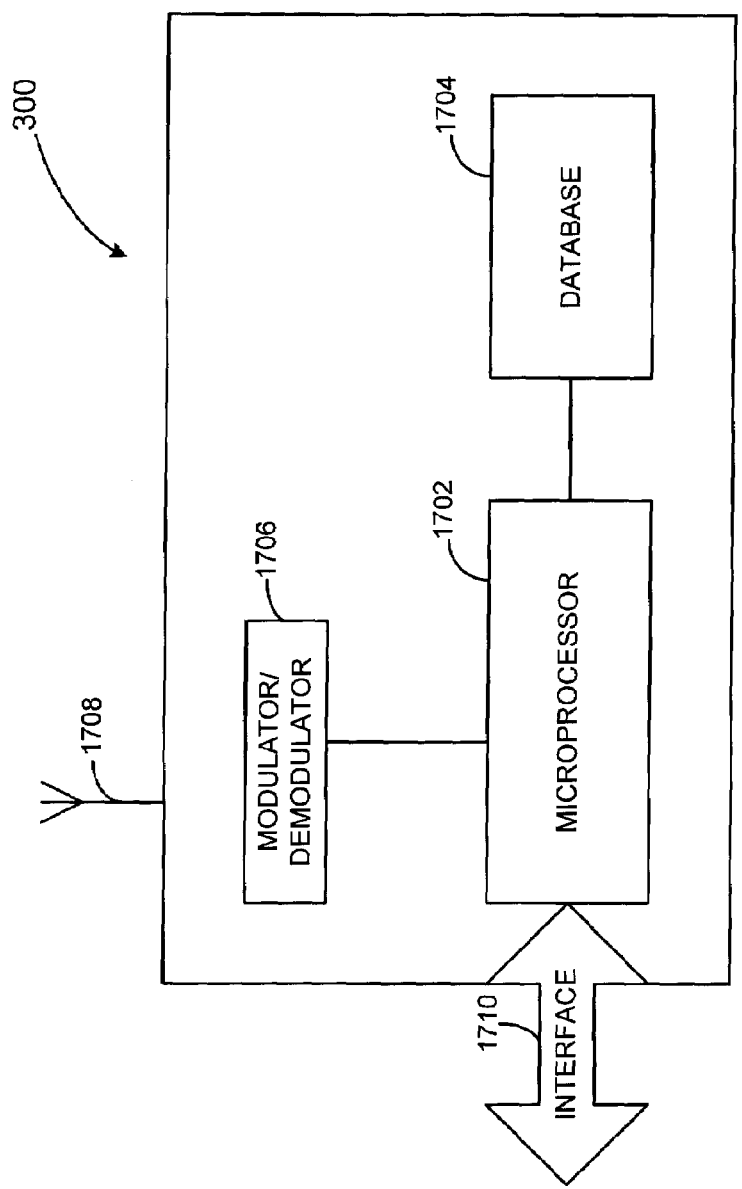
FIG. 17 depicts an exemplary RF module in physical and logical communication with an exemplary mobile device microprocessor in accordance with exemplary embodiments of the present invention.

In still another exemplary embodiment, the removed RF module 20 may be placed in physical and logical communication with a microprocessor of a mobile device, such as for example, the cell phone 300 discussed with regard to FIG. 3. As shown in FIG. 17, the phone 300 may include a microprocessor 1702 for controlling the operation of the phone 300. The microprocessor 1702 may be in communication with a mobile device database such as cell phone database 1704, for data storage and retrieval. For example, in the case of cell phone 300, database 1704 may store personal contact information, calendars, pictures, or the like. The cell phone 300 may also include a modulator/demodulator 1706 connected to the processor 1702 and a cell phone antenna 1708, for transmitting signals received from the antenna 1708 to the microprocessor 1702. RF module 20 may be placed in physical or logical communication with the microprocessor 1702 using any conventional coupling methods for connecting electrical components.

In another exemplary method for placing the RF module 20 in physical and logical communication with microprocessor 1702, the RF module 20 may include contact points that are compatible with a mobile device expansion card slot. Expansion cards are typically cards which contain instructions or data which the processor may use to enhance the functionality of an electronic device including a processor or microprocessor. One popular example of an expansion card is the subscriber identity module (SIM).

Ordinarily, SIMs are configured to provide control applications to the mobile device for controlling and increasing the device's functionality. Most SIMs are in the form of a chip card that establishes the subscriber relationship with the mobile phone system operator. The chip card typically includes electrical contacts which mate with electrical contacts of the mobile device for placing the chip card in communication with the mobile device processor. The mobile device mating contacts are usually included in a slot formed in the housing of the mobile device for receiving and securing the chip card thereto.

The SIMs are personalized with an IMSI, Ki, etc., prior to providing the SIMs to the mobile device user, at a "personalization" center run by the mobile phone network operator. Important individual subscriber data saved on the SIM facilitates the use of the mobile phone services. The SIM contains the mobile subscriber identification (IMSI), the secret individual subscriber key (Ki) an authentication algorithm (A3), a ciphering key generating algorithm (A8), a personal identification number (PIN) and other permanent and temporary data. The SIM contains at least one microchip which holds information on the subscription and which, when the SIM card is inserted in a mobile terminal, is connected thereto.

However, SIMs have a major drawback in that the SIMs ordinarily do not influence the behavior of the mobile device by managing presentation of new services (or software applications) to the user. To mitigate that drawback, GSM Recommendation 11.14 phase 2+ defines the ground rules for implementing a toolkit in the subscriber identity module, and for enabling operators to create their own specific applications independently of the mobile terminal used, provided that the terminal is compatible with GSM Recommendation 11.14 phase 2+. Furthermore, to make it possible to dialog with and to use the toolkit, GSM Recommendation 11.11 phase 2+ specifies the mechanisms that make the two portions (the mobile terminal and the subscriber identity module) interoperable. In other words, the SIMs may have commands available that it can have executed by the terminal.

For additional explanation on SIMs operation and protocol, please refer to ETSI publications prepared by various ETSI workgroups: GSM 02.19 Digital cellular telecommunications system (Phase 2+), Subscriber Identity Module Application Programming Interface (SIM API), Service description; Stage 1; GSM 02.48 Digital cellular telecommunications system (Phase 2+), Security mechanisms for the SIM application toolkit; Stage 1; GSM 03.19 Subscriber Identity Module Application Programming Interface (SIM API); SIM API for java Card(™), Stage 2; GSM 03.48 Digital cellular telecommunications system (Phase 2+), Security Mechanisms for the SIM application toolkit; Stage 2; GSM 11.11 Digital cellular telecommunications system (Phase 2); Specification of the Subscriber Identity Module—Mobile Equipment (SIM—ME) interface; (GSM 11.11); GSM 11.14: Specification of the SIM application toolkit for the Subscriber Identity Module—Mobile Equipment (SIM—ME) interface; WAP WIM Wireless Application Protocol Identity Module Specification, available (for free) at www.wapforum.org; 3G TS 21.111 Version 3.0.0, USIM and IC Card Requirements; entitled Removable User Identity Module (R-UIM) for Spread Spectrum Systems (3GPP2 C.S0023) of Dec. 9, 1999; CDMA Development Group Document #43, Smart Card Stage I Description, Version 1.1, May 22, 1996; GSM 02.17—Subscriber Identity Module (SIM); Functional Characteristics; 3GPP 22.038—SIM Application Toolkit (SAT), Stage 1; 3GPP 22.112—USIM Toolkit Interpreter Stage 1; 3GPP 31.102—Characteristics of the USIM Application; 3GPP 31.111—USIM Application Toolkit (USAT); 3GPP 31.113—USAT Interpreter Byte Codes; 3GPP 31.131—C API for the USIM Application Toolkit; 3GPP 34.131—Test Specification for the C SIM API; SCP 101.220 Integrated Circuit Cards (ICC); ETSI Numbering System for Telecommunication; Application Providers (AID); SCP 102.221 Smart Cards; UICC—Terminal Interface; Physical and Logical Characteristics; SCP 102.222 Integrated Circuit Cards (ICC); Administrative Commands for Telecommunications Applications; SCP 102.230 Smart Cards; UICC—Terminal interface; Physical, Electrical and Logical Test Specifications; SCP 102.223—Smart Cards; Card Application Toolkit (CAT); SCP 102.224 Security mechanisms for the Card Application Toolkit: Functional requirements; SCO 102.225—Secured packet structure for UICC applications; SCP 102.226—Remote APDU Structure for UICC based Applications; SCP 102.240—UICC Application Programming Interface, and all related text, which is hereby incorporated by reference.

While the SIMs are useful for expanding the functionality of the mobile devices, conventional SIMs are useful for converting the mobile device into a transaction device useful in completing transactions. The present invention solves this problem by providing a RF module configured to communicate with a mobile device microprocessor using connectors contained on the mobile device. For example, RF module may be configured to fit within a SIM slot and mate with a mobile device, SIM connectors.

Figure 18:
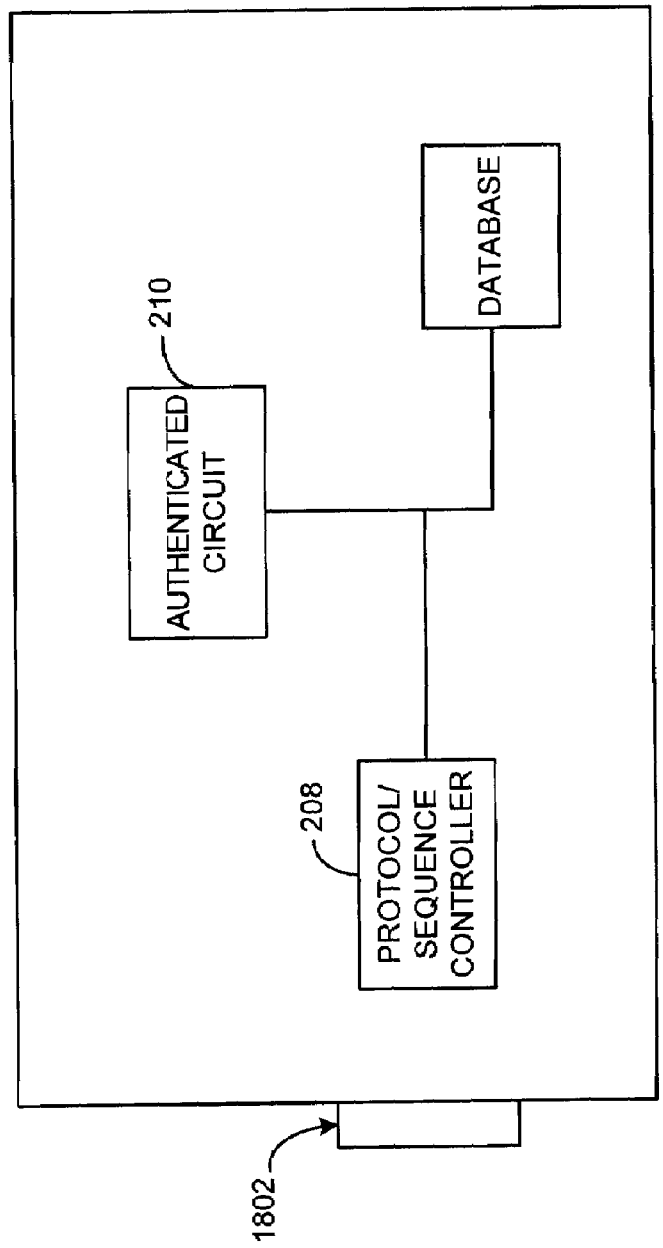
FIG. 18 depicts an exemplary RF module including electrical contacts for use in a (SIM) slot for converting the mobile device to a RF transaction device in accordance with exemplary embodiments of the present invention.

FIG. 18 depicts an exemplary alternate embodiment of RF module 20 including electrical connectors 1802 configured to communicate with, and be compatible with, conventional SIM connectors on a mobile device, such as, cell phone 300. RF module 20 of FIG. 18 may have similar description as module 300. However, in this instance RF module 20 includes electrical connectors 1802 which may be in communication with the module protocol/sequence controller 208. The connectors 1802 may additionally place the RF module protocol/sequence controller 208 in communication with the mobile device microprocessor (e.g., cell phone microprocessor 1702), for transmitting information thereto. Notably, the module 20 may be manufactured and provided to the end user using any of the methods described herein, for example, by using the methods described in FIGS. 8 and 10.

Figure 19:
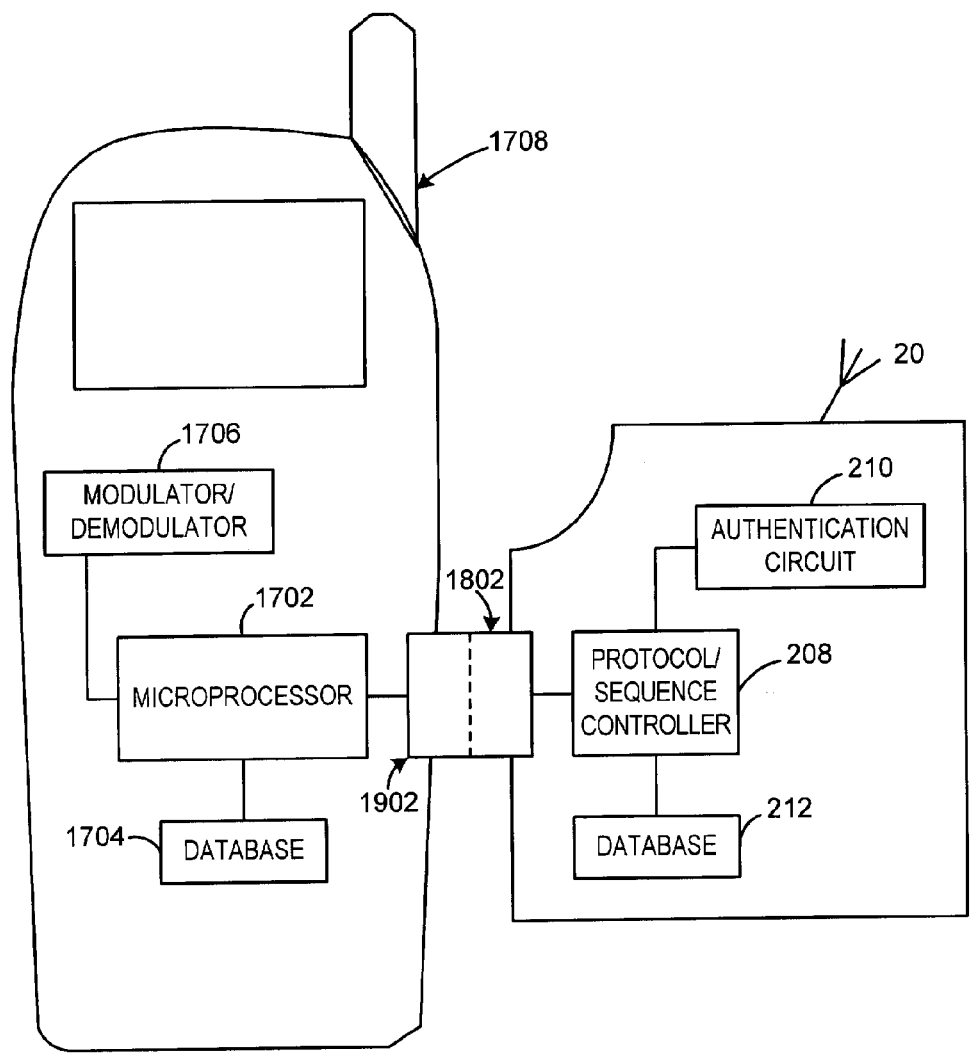
FIG. 19 depicts an exemplary mobile device including electrical contacts for inclusion of a subscriber identity module (SIM) in accordance with exemplary embodiments of the present invention.

FIG. 19 depicts the module 20 including connectors 1802 placed in physical and logical communication with the electrical connectors 1902 of a mobile device, such as, cell phone 300. As shown, the electrical connectors 1802 are placed in contact with the connectors 1902 so that information may be communicated between the RF module 20 and the microprocessor 1702. As described more fully below, the cell phone 300 in communication with RF module 20 may be converted into a RF transaction device for completing a RF transaction.

Figure 20:
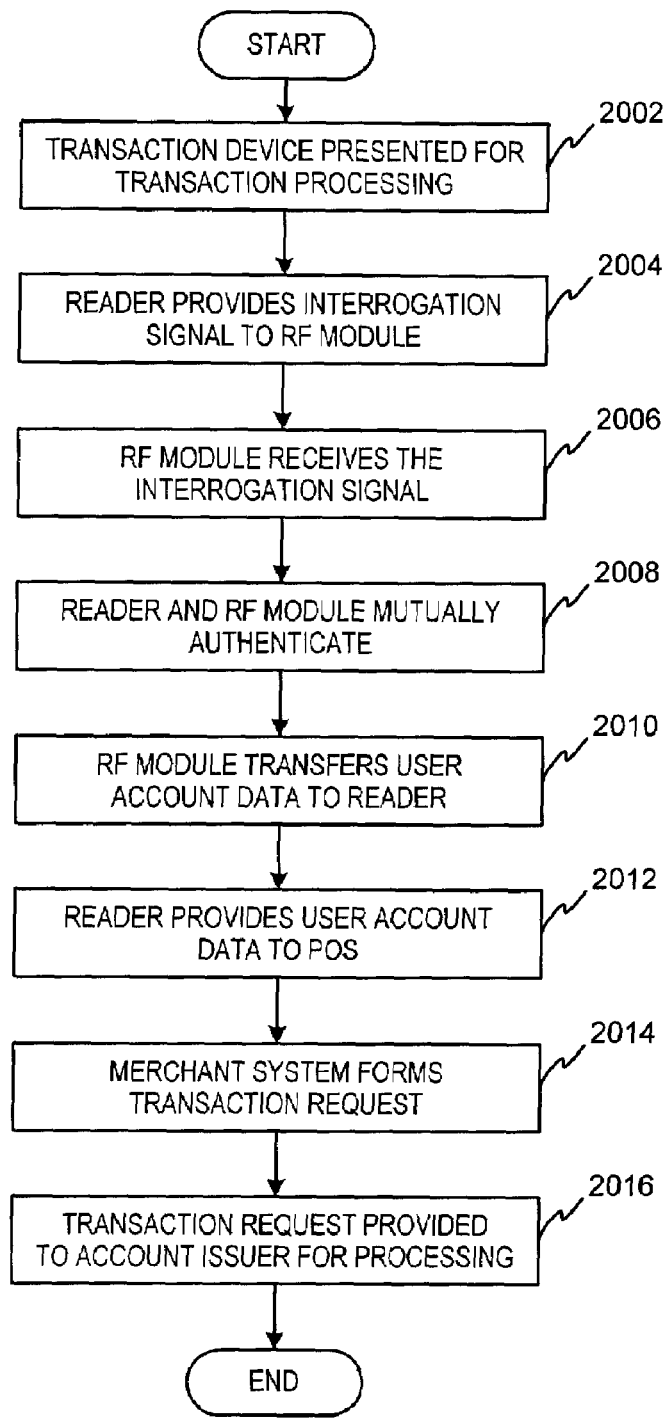
FIG. 20 illustrates an exemplary method for processing a transaction in accordance with exemplary embodiments of the present invention.

FIG. 20 illustrates an exemplary transaction processing method using the RF module placed in physical and logical communication with a mobile device microprocessor as described above. FIG. 20 is best understood with reference to FIG. 1, FIG. 6, and FIG. 21 described below. As illustrated, the transaction device 102 is a mobile device, such as for example, mobile phone 300, that is configured to process a transaction using a RF module 20 in physical and logical communication with the microprocessor 1702 of the mobile device 300. The RF module 20 is provided to the end user using any of the methods described herein. In one example, the RF module 20 is provided integral to the mobile device housing and in physical and logical communication with the microprocessor 1702. In this way, the RF module 20 may be included in the mobile device when the device is manufactured. In a separate example, the RF module 20 is provided to the end user independently of the mobile device. The RF module 20 is placed in communication with the mobile device microprocessor using electrical connectors.

Figure 21:
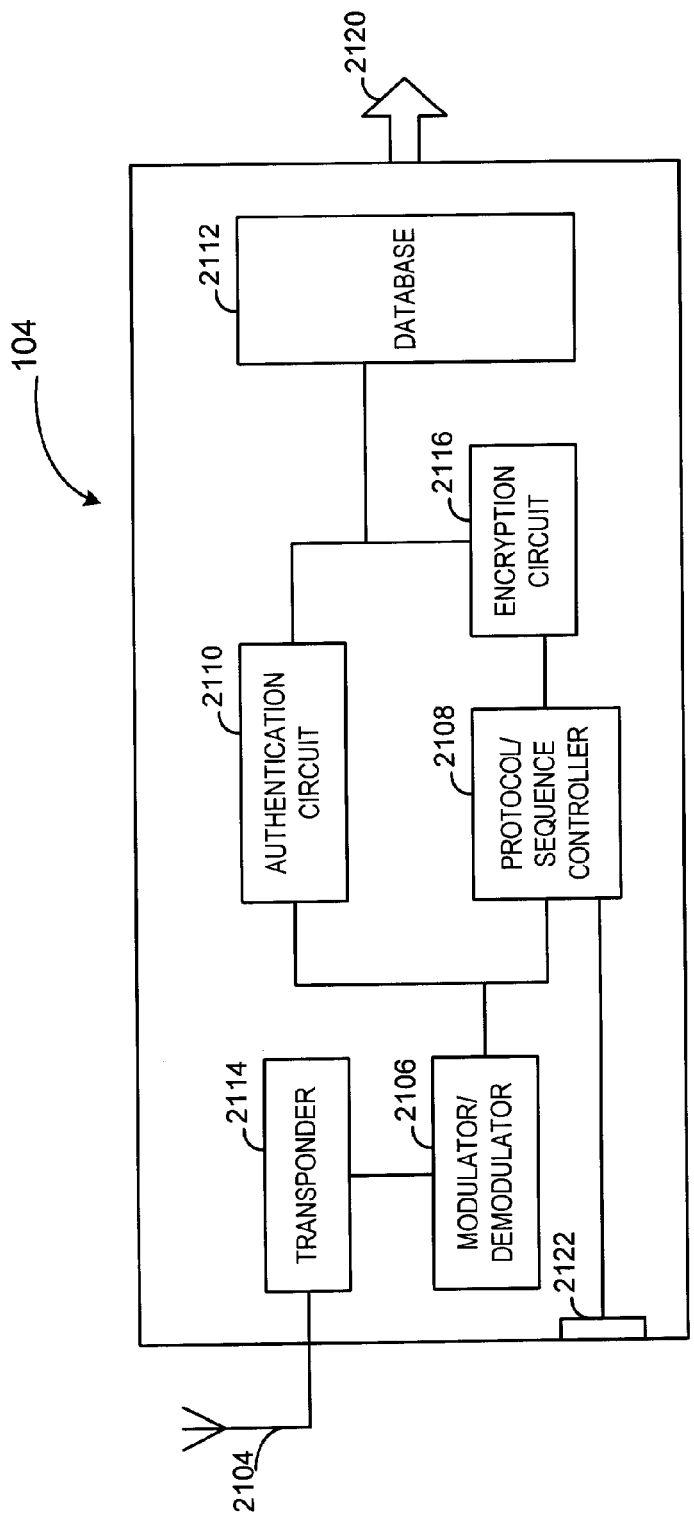
FIG. 21 depicts the functional components of an exemplary RFID reader useful with the present invention.

With brief reference to FIGS. 6 and 21, the functional components of an exemplary RFID reader 104 is described. As shown, RFID reader 104 may include an antenna 2104 for providing an interrogation signal from RFID reader 104 to the RF module 20 antenna 204. RFID reader 104 antenna may be in communication with a reader transponder 2114. In one exemplary embodiment, transponder 2114 may be a 13.56 MHz transponder compliant with the ISO/IEC 14443 standard, and antenna 2104 may be of the 13 MHz variety. The transponder 2114 may be in communication with a modulator/demodulator 2106 configured to receive the signal from transponder 2114 and configured to modulate the signal into a format readable by any later connected circuitry. Further, modulator/demodulator 2106 may be configured to format (e.g., demodulate) a signal received from the later connected circuitry in a format compatible with transponder 2114 for transmitting to RF module 20 via antenna 2104. For example, where transponder 2114 is of the 13.56 MHz variety, modulator/demodulator 2106 may be ISO/IEC 14443-2 compliant.

Modulator/demodulator 2106 may be coupled to a protocol/sequence controller 2108 for facilitating control of the authentication of the signal provided by RF module 20, and for facilitating the formatting of the data received from RF module 20 in a format compatible with, for example, a merchant POS 110. In this regard, protocol/sequence controller 2108 may be any suitable digital or logic driven circuitry capable of facilitating determination of the sequence of operation for the RFID reader 104 innercircuitry. For example, protocol/sequence controller 2108 may be configured to determine whether the signal provided by the RF module 20 is authenticated, and thereby providing to the RF module 20 account number to the merchant POS 110.

Protocol/sequence controller 2108 may be further in communication with authentication circuitry 2110 for facilitating authentication of the signal provided by RF module 20. Authentication circuitry 2110 may be further in communication with a non-volatile secure memory database 2112. Secure memory database 212 may be of similar description as database 212 described above. Authentication circuitry 2110 may authenticate the signal provided by RF module 20 by association of the signal to authentication keys stored on database 2112. Encryption circuitry 2116 may use keys stored on database 2112 to perform encryption and/or decryption of signals sent to or from the RF module 20.

Returning now to FIG. 20, a typical transaction in accordance with this invention is described. The transaction may begin when an end user presents the transaction device (e.g., 300) including a RF module 20 for transaction processing (step 2002). The RFID reader 104 provides an interrogation signal to the RF module 20 for activating the RF module 20 for transaction processing (step 2004). The RF module 20 receives the interrogation signal (step 2006) and the RF module 20 and the RFID reader 104 engage in mutual authentication to determine if each is a valid device for operation on system 100 (step 2008).

Figure 22:
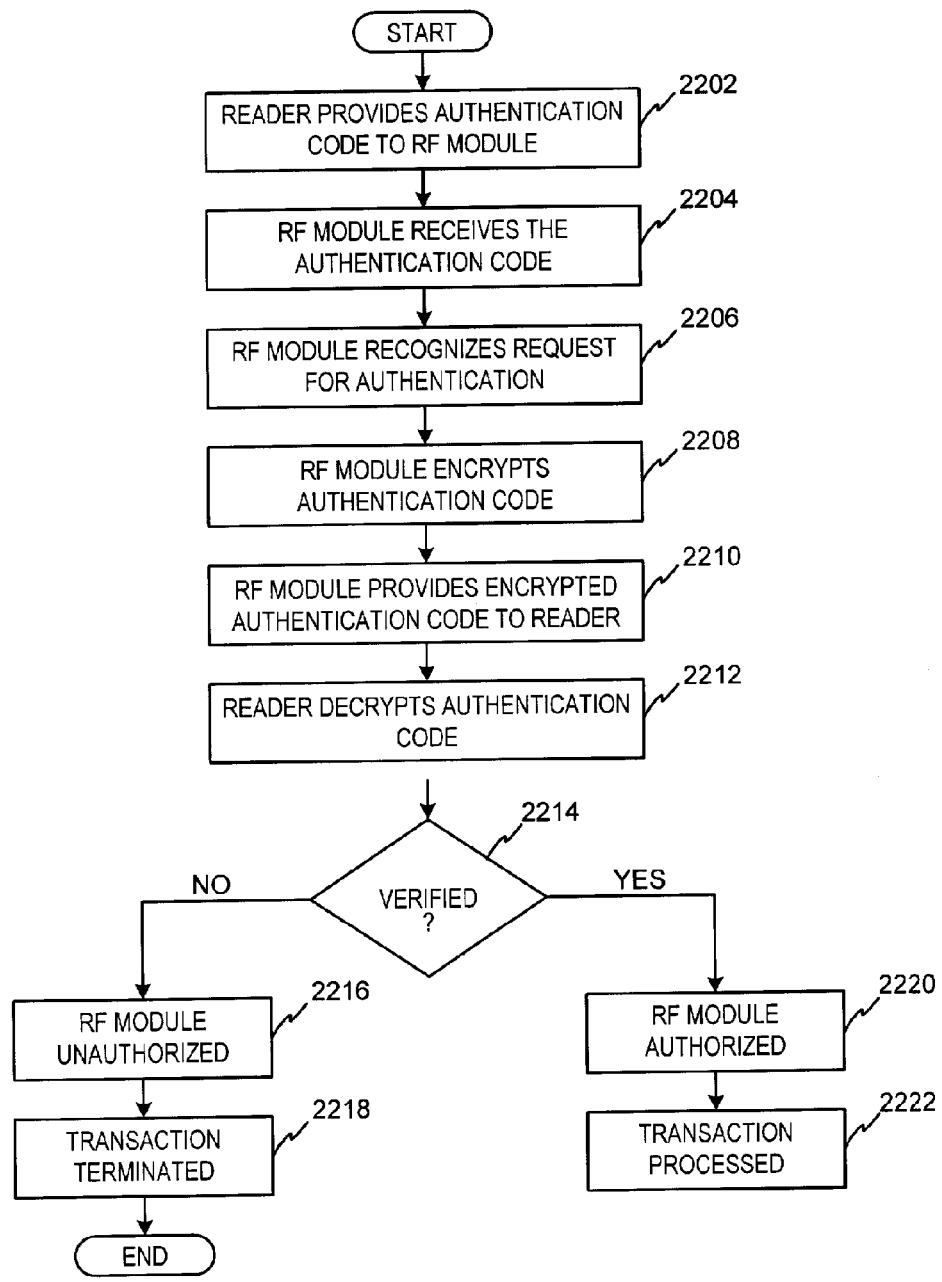
FIG. 22 depicts an exemplary mutual authentication process in accordance with the present invention.

FIG. 22 is a flowchart of an exemplary authentication process in accordance with the present invention. The authentication process is depicted as one-sided. That is, the flowchart depicts the process of the RFID reader 104 authenticating the RF module 20, although similar steps may be followed in the instance that RF module 20 authenticates RFID reader 104. In some embodiments, the RF module 20 and the RFID reader 104 may engage in mutual authentication. In this context, "mutual authentication" may mean that operation of the system 100 may not take place until RF module authenticates the signal from RFID reader 104, and RFID reader 104 authenticates the signal from RF module 20.

As noted, database 2112 may store security keys for encrypting or decrypting signals received from RF module 20. In an exemplary authentication process, where RFID reader 104 is authenticating RF module 20, RFID reader 104 may provide an interrogation signal to RF module 20 (see step 2002 of FIG. 20). The interrogation signal may include a random code generated by the RFID reader authentication circuit 2110, which is provided to the RF module 20, and which is encrypted using a unique encryption key corresponding to, for example, a RF module 20 unique identification code. In a typical scenario, the protocol/sequence controller 2108 may provide a command to activate the authentication circuitry 2110. Authentication circuitry 2110 may provide from database 2112 an interrogation signal including a random number as a part of the authentication code generated for each authentication signal. The authentication code may be an alphanumeric code which is recognizable (e.g., readable) by the RFID reader 104 and the RF module 20. The authentication code may be provided to the RF module 20 via antenna 2104 (step 2202).

RF module 20 receives the authentication code (step 2204). The interrogation signal including the authorization code may be received at the RF module antenna 204. The authorization code may be provided to the modulator/demodulator circuit 206 where the signal may be demodulated prior to providing the signal to protocol/sequence controller 208. Protocol/sequence controller 208 may recognize the interrogation signal as a request for authentication of the RF module 20 (step 2206), and provide the authentication code to authentication circuit 210. Authentication circuit 210 or protocol/sequence controller 208 may retrieve an encryption key from database 212 and authentication circuit 210 may encrypt the authentication code using the retrieved encryption key (step 2208). RF module 20 may then provide the encrypted authentication code to the RFID reader 104 for verification (step 2210). The encrypted authentication code may be provided to the RFID reader 104 via RF module modulator/demodulator circuit 206, transponder 214, and antenna 202.

RFID reader 104 may then receive the encrypted authentication code and decryption it (step 2212). That is, the encrypted authentication code may be received at antenna 2104 and transponder 2114, and provided to authentication circuit 2110. Authentication circuit 2110 may be provided a security authentication key (e.g., transponder system decryption key) from database 2112. The authentication circuit 2110 may use the authentication key to decrypt (e.g., unlock) the encrypted authorization code. The authentication key may be provided to the authentication circuit 2110 based on the RF module 20 unique identification code. For example, the encrypted authentication code may be provided along with the unique RF module 20 identification code. The authentication circuit 2110 may receive the RF module 20 unique identification code and retrieve from the database 2112 a transponder system decryption key correlative to the unique RF module 20 identification code for use in decrypting the encrypted authentication code.

Once the authentication code is decrypted (step 2212), the decrypted authentication code is compared to the authentication code provided by the RFID reader 104 to verify its authenticity (step 2214). If the decrypted authorization code is not readable (e.g., recognizable) by the authentication circuit 2110, the RF module 20 is deemed to be unauthorized (e.g., unverified) (step 2216) and the operation of system 100 is terminated (step 2218). Contrarily, if the decrypted authorization code is recognizable (e.g., verified) by the RF module 20, the decrypted authorization code is deemed to be verified or authenticated (step 2220), if so, the transaction is allowed to proceed (step 2222). In one particular embodiment, the preceding transaction may mean that the RF module 20 may authenticate the RFID reader 104, although, it should be apparent that the RFID reader 104 may authenticate the RF module 20 prior to the RF module 20 authenticating the RFID reader 104.

With return reference now to FIG. 20, upon successful mutual authentication, the RF module 20 transfers to the RFID reader 104 such data as is necessary to process a transaction request ("user account data") (step 2210).

The RFID reader 104 receives the user account data at the antenna 2104, and provides the data to the POS interface 2120 (step 2012). In one exemplary embodiment, the RFID reader authentication circuit 2110 may receive the data and provide the data to the RFID reader interface 2120. The RFID reader interface 2120 may then receive the data and convert the data to a merchant POS 110 recognizable format for providing to the merchant system 130. In an exemplary embodiment, the user account data is provided to the RFID reader 104 in magnetic stripe format. In yet another embodiment, the RFID reader 104 provides the user account data to the merchant POS 110 in magnetic stripe format.

The merchant system 130 may receive the user account data and use the data to form a transaction request (step 2014). The transaction request may include the user account data and any information related to the transaction. The merchant system 130 may provide the transaction request to a user account issuer for processing under business as usual standards (step 2016). Notably, the transaction applications for processing the authentication signal and providing the user account data may be stored in a transaction application on for example, in the database 212 for use by the authentication circuit 210.

In one exemplary embodiment of the invention, the transaction device 102 (e.g., mobile phone 300) may include a USB interface 2122 in communication with the protocol/sequence controller 2108. In this exemplary embodiment, the USB interface 2122 may be a RS22 serial data interface. Alternatively, the RFID reader 104 may include a serial interface such as, for example, a RS232 interface in communication with the protocol/sequence controller 2108. In either embodiment, the interface may be in communication with the protocol/sequence controller 2108 for providing user account data from the RF module 20 for transaction processing, using, for example, the transaction processing method of FIG. 20.

To facilitate the user account data transfer from the RF module 20 to the interface 2122, the mobile phone 300 may be equipped with a USB interface 304 (shown in FIG. 13) or the like. The mobile device USB interface 304 may be included in the mobile device 300, when the phone 300 is manufactured and prior to providing the phone to the end user. The mobile device USB interface 304 may be placed in communication with the USB interface 2122. In that regard, USB interface 304 may be compatible with USB interface 2122, such that the data received from the mobile phone 300 is recognizable by the RFID reader 104.

In a typical embodiment, the RF module 20 is in physical and logical communication with the mobile device (e.g., mobile phone 300) microprocessor 1702, for transmitting user account data from the RF module 20 to the RFID reader 104. The module protocol/sequence controller 208 may retrieve the user account data from the module database 212 and provide the data to the microprocessor 1702. The microprocessor 1702 may then provide the user account data to the USB interface 304 for providing to the RFID reader USB interface 2122. USB interface 2122 may receive the user account data and provide the data to a merchant POS 110 for processing as described above.

It should be noted that although the present invention is described with respect to the mobile device USB being connected to a USB of a RFID reader 104, the invention is not so limited. For example, the mobile device USB may be connected to a similar port (e.g., USB port) included on a kiosk, or personal computer, stand alone computing device, or the like. In this case, the user account data may be transmitted from the mobile device to the kiosk or other computer and to an offline or online account issuer or merchant system for transaction processing via an open or closed network. In this instance, an "open" network is one susceptible to eavesdropping.

Placing the RF module 20 in physical and logical communication has the advantage in that the RF module 20 may be powered by a power source of the mobile device. That is, the RF module 20 may share a similar power source as does the functional components of the mobile device. Another advantage is that the mobile device's user interface may be used to verify secondary information from the end user.

For example, the RF module 20 may need to be switched on prior to use for transaction completion. In this case, the end user may use the mobile device user interface (e.g., keyboard 306) to enter a alphanumeric code for powering the RF module 20. The alphanumeric code may be received by the microprocessor 1702 and forwarded to the protocol sequence controller 2108 to commence a transaction using the RF module 20. In another instance, the end user may provide an alphanumeric code in response to a request from the RFID reader 104 for further authentication of the end user's identity. For example, the RFID reader 104 may send a message to the RF module 20 that a secondary form of identification, such as a personal identification number (PIN), is required before a transaction may proceed. The RFID reader authentication circuit 2110 may receive a signal from the RF module 20 and recognize that the end user's identity may need to be verified using a PIN. The authentication circuit 2110 may then provide the RF module 20 with a request for the end user to provide the PIN before the RF module provides the user account data to the RFID reader 104.

In one exemplary embodiment, the reader 104 may provide the request for a PIN to the RF module 20 at antenna 204. The RF module transponder 214 may receive the request and provide the request for PIN to the protocol/sequence controller 208. The protocol/sequence controller 208 may provide the request to the mobile phone microprocessor 1702, and the microprocessor 1702 may send a prompt to the mobile device display unit, such as the display unit 308 of mobile phone 300. The display unit 308 may be any conventional display units that are used with mobile personal communication devices, such as, mobile phones, PDAs, personal computers or the like. Suitable display units which may be used with the invention include a liquid crystal display unit (LCD), image display device, or the like. The display unit may be any display unit capable of displaying messages to the end user.

The end user may then be permitted to input the PIN using the keypad user interface 306. The PIN may be provided to the microprocessor 1702, which may provide the PIN to the module protocol/sequence controller 208. The protocol/sequence controller 208 may provide the PIN to the module authentication circuit 210, which may retrieve from the database 212 (or from encryption circuit 216) a PIN verification key and use the verification key to authenticate the PIN. The authentication circuit 210 may use any authentication method as is found in the art, or disclosed herein to verify the PIN. In one exemplary embodiment, the authentication circuit 210 may compare the PIN provided by the end user to the PIN verification key using any comparison method permitting the authenticity of the PIN to be verified.

Alternatively, the RF module protocol/sequence controller 208 may provide the PIN to the RFID reader 104 for authentication. The RFID reader authentication circuit 210 may receive the PIN and verify the PIN in a similar manner as is discussed with respect to the RF module 20.

Notably, the method by which the end user provides the PIN to the microprocessor 1702 may vary. For example, the user interface may include a touch screen display and a stylus as is found in the art. Additionally, the secondary form of identification may be provided using biometric or voice recognition technology. The mobile device may receive the biometric or voice data and convert it into data recognizable by the RF module protocol/sequence controller 208 for verification using the methods discussed above.

To facilitate the above transaction and authentication methods, the RF module 20 may be "personalized" to include user account data, encryption, decryption keys, and the like. The information provided to the RF module 20 during the personalization process may be used to enable the RF module 20 to process a RF transaction. Such information may be stored in a "personalization file," provided to the RF module 20 and stored on module database 212.

Figure 23:
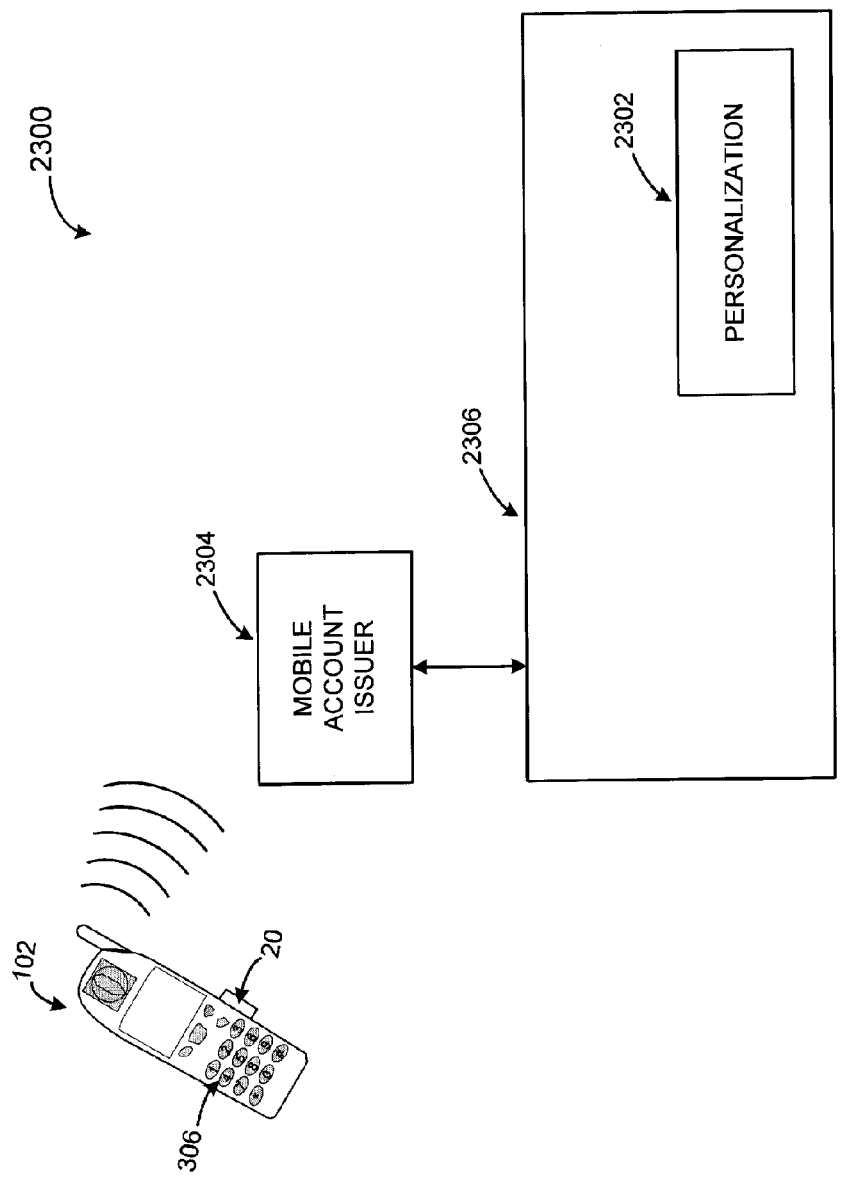
FIG. 23 depicts an exemplary personalization system useful with the present invention.
Figure 24:
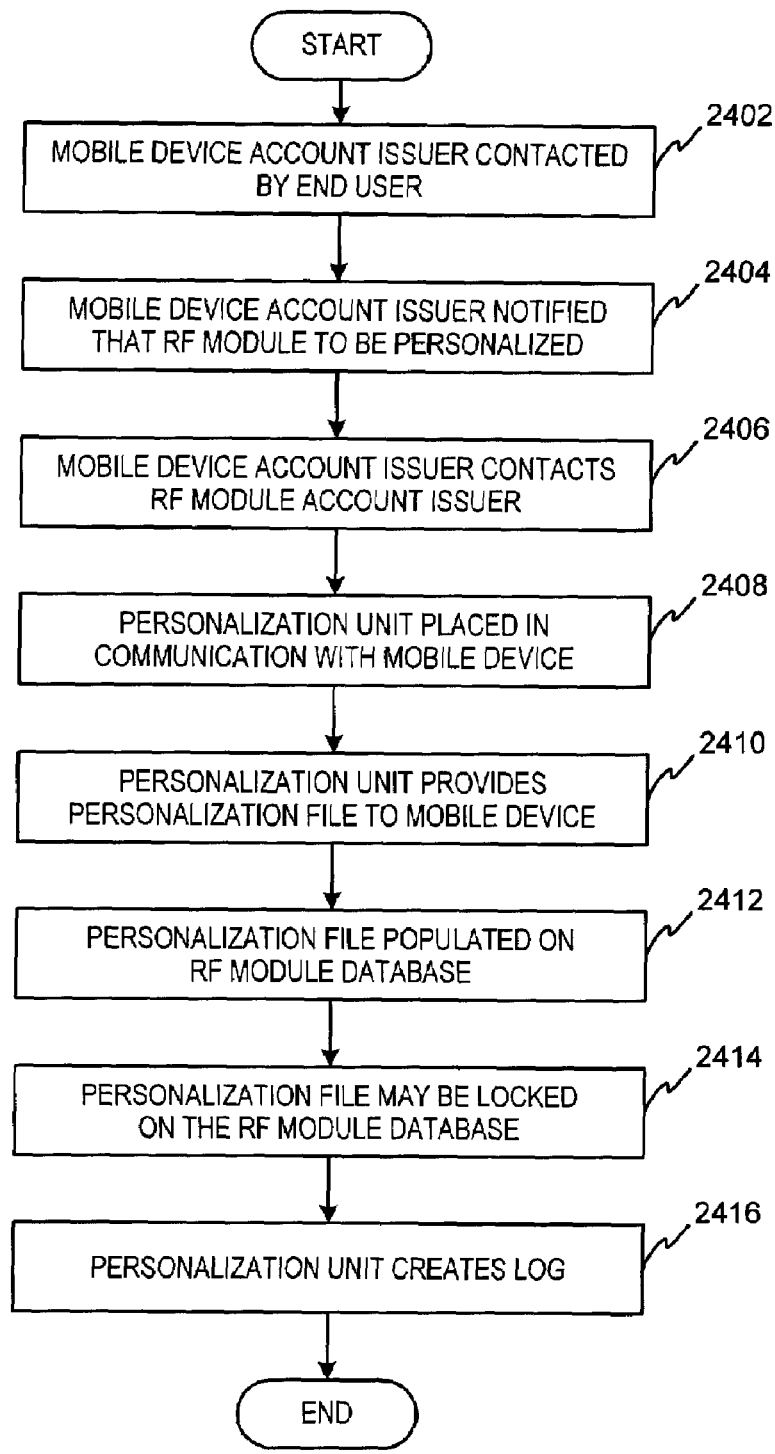
FIG. 24 illustrates an exemplary personalization method useful with the present invention.

FIG. 23 illustrates an exemplary personalization system 2300, and FIGS. 24A–B depict an exemplary personalization method, useful with the present invention. The personalization system 2300 includes a transaction device 102 in communication with a mobile device account issuer 2304, which is in further communication with a RF module account issuer 2306, including a personalization unit 2302 for personalizing the RF module 20.

The transaction device 102 may be in communication with the mobile device account issuer 2304 via communications using the transaction device 102 ordinary communication method. Alternatively, the transaction device 102 may be in communication with the mobile device account issuer 2304 using a mobile device USB connector (e.g., USB connector 304) in communication with a kiosk, stand alone computer, or online computer or the like, in communication with the mobile device account issuer 2304.

To begin personalization, the end user may, for example, contact a mobile device issuer 2304 using a key pad 306 and the mobile device's ordinary method of communication (step 2402). The end user notifies the mobile device account issuer 2304 that a RF module 20 is to be personalized (step 2404). In this context, a mobile account issuer 2304 may include any service provider for mobile phones. Exemplary providers may include AT&T, Southern Bell, Cox Communications, Sprint, Verizon, Cingular, T-Mobile, Nextel, etc. The ordinary method of communication may be any suitable data transmission method as is used by the exemplary providers.

The mobile device account issuer 2034 may then establish communication with the RF module account issuer 2306 for transmitting personalization or authentication information thereto (step 2406). The mobile account issuer 2304 may facilitate direct or indirect communication between the RF module account provider 2306 and the mobile device 102 or RF module 20. The mobile device account provider 2304 may, for example, facilitate "direct" communication by facilitating communication between mobile device 102 and the RF module 20 so that information may be directly transmitted between the device 102 and the RF module account provider 2306. Alternatively, the mobile device account issuer 2304 may establish "indirect" communications by facilitating communication between the mobile device 102 and the RF module account issuer 2306, via third party or via the mobile account issuer system 2304. In either instance, the RF module account issuer 2306 is placed in communication with the RF module 20 (via mobile device 102) for authentication and personalization.

Personalization unit 2302, which may be included in RF module account issuer system 2306, may be placed in communication with a mobile phone 300 (step 2408).

Personalization unit 2302 may be in communication with the RF module 20 while in physical and logical communication with the mobile device 300 for populating RF module database 212 with the security keys and identifiers for facilitating authentication of the unique RFID reader 104 identifier. Personalization unit 2302 may also populate (e.g., inject) the encrypted RF module 20 account number into RF module database 214 for later providing to an authenticated RFID reader 104.

In one exemplary embodiment, personalization unit 2302 may include any standard computing system as described above. For example, personalization unit 2302 may include a standard personal computer containing a hardware security module operable using any conventional graphic user interface.

Personalization unit 2302 and RF module 20 may be configured to transmit a RF module personalization file to RF module 20 using the mobile device ordinary transmission method (step 2410). The personalization unit 2302 may create as a part of the personalization file, a unique identifier for providing to the RF module 20. The identifier is unique in that one identifier may be given only to a single fob. That is, no other RF module may have that same identifier. The RF module 20 may then be configured and loaded with that identifier. That is, the RF module unique identifier may be provided to the module protocol/sequence controller 208 which may provide the unique identifier to the database 212. The personalization file may be provided as encrypted data although encryption is not required.

The encrypted RF module 20 personalization file may be populated into RF module 20 (step 2412). Mobile phone 300 may receive the personalization file at mobile phone antenna 1708, demodulate the information at modulator/demodulator 1706, receive the information at microprocessor 1702, and forward the information to RF module 20. Microprocessor 1702 may provide the personalization file to the RF module 20 protocol/sequence controller 208 and inject the encrypted account into RF module database 212.

Once the personalization file is populated into the RF module 20, the populated information is irreversibly locked to prevent alteration, unauthorized reading and/or unauthorized access (step 2414). Personalization unit 2302 may then create a log of the personalization file information for later access and analysis by the personalization unit 2302 user (step 2416).

It should be noted that in the event the personalization unit 2302 process is compromised or interrupted, the personalization system may send a security alert to the user and the personalization process may be aborted. On the other hand, where no such compromising or interruption exists, the personalization system may be prepared to begin personalization of subsequent RF modules.

Figure 25:
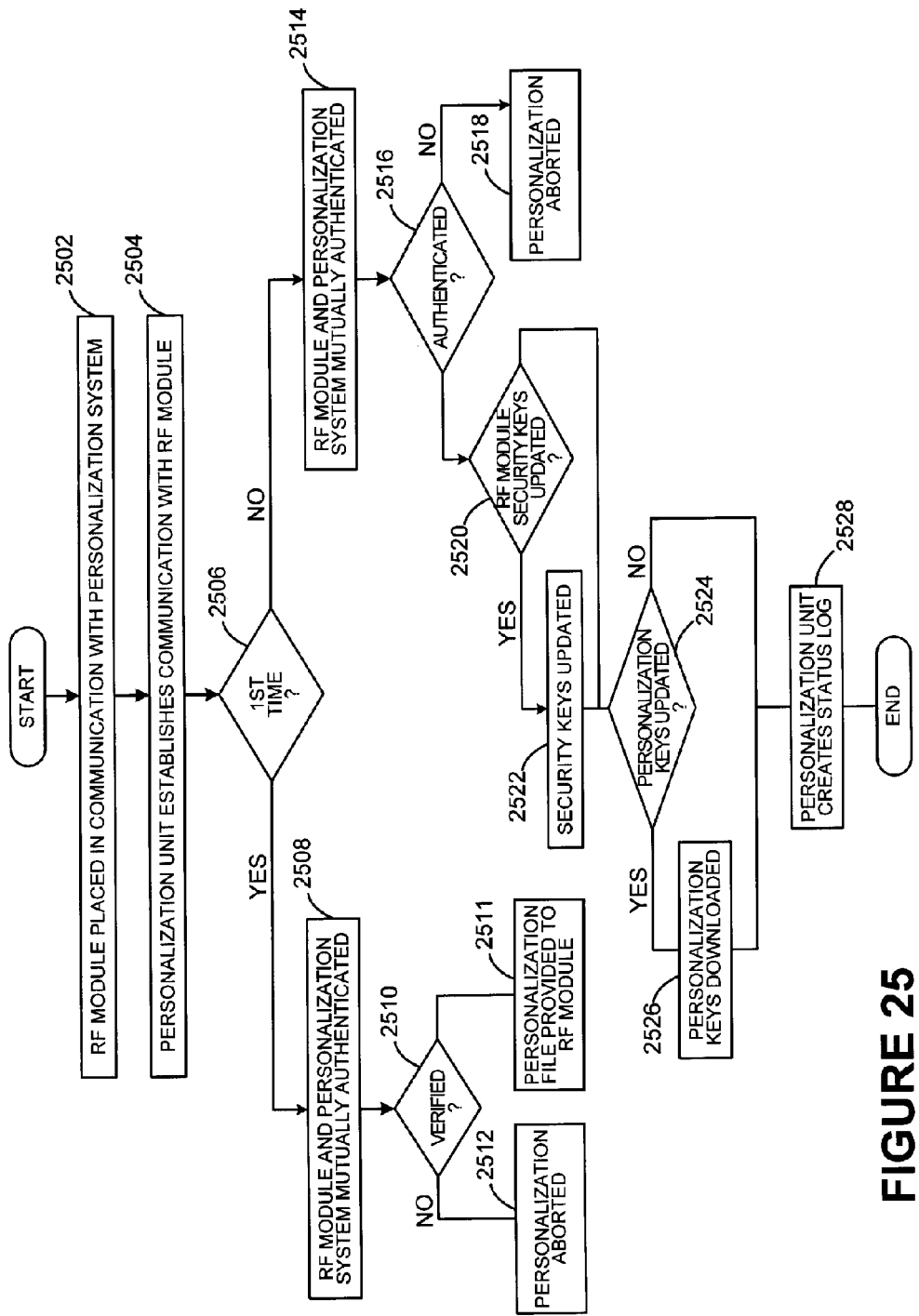
FIG. 25 illustrates an exemplary personalization method useful with the present invention.

FIGS. 25A–B illustrate another exemplary embodiment of a personalization process which may be used to personalize RF module 20, where the RF module 20 may be personalized for the first time. By way of example, the method discusses a RF module 20 placed in communication with a personalization unit 2302 via a transaction device USB connector, such as, USB 304 (step 2502). Once connected, personalization unit 2302 may establish communications with the RF module 20 (step 2504). If the RF module 20 is being personalized for the first time (step 2506) the RF module 20 and the personalization unit 2302 may engage in mutual authentication as described above with respect to FIGS. 24A–B (step 2508). After the mutual authentication is complete, personalization unit 2302 may verify that RF module 20 is properly manufactured or configured to operate within system 100 (step 2510). The verification may include evaluating the operation of the RF module 20 by determining if the RFID reader will accept predetermined default settings. That is, the personalization unit 2302 may then provide the RF module 20 a set of default settings and determine if the RF module 20 accepts those settings. If RF module 20 does not accept the default settings, personalization unit 2302 may abort the personalization process (step 2512). Otherwise the personalization unit 2302 provides the personalization file to the RF module 20 for storing on database 212 (step 2511).

If the personalization unit 2302 determines that the personalization process is not the first personalization process undertaken by the RF module 20 (step 2506), personalization unit 2302 and RF module 20 may engage in a mutual authentication process using the existing security keys already stored on RF module 20 (step 2514). If authentication is unsuccessful (step 2516), the personalization system may abort the personalization process (step 2518).

Where the personalization unit 2302 and the RF module 20 successfully mutually authenticate (step 2520), the personalization unit 2302 may update the RF module 20 security keys (step 2522). Updating the security keys may take place at any time as determined by a system RF module account provider 2306. The updating may take place as part of a routine maintenance or merely to install current security key data. The updating may be performed by downloading firmware into RF module 20. In the event that the personalization system determines that the RF module 20 is undergoing an initial personalization, the firmware may be loaded into the RF module 20 for the first time. In this context, "firmware" may include any file, which enables the RF module 20 or RFID reader 104 to operate under system 100 guidelines. For example, such guidelines may be directed toward the operation of RFID reader protocol/sequence controller 314.

Personalization unit 2302 may then determine if the personalization keys (e.g., security keys, encryption decryption keys, RF identifier, RF module identifier or account number, etc.) need to be updated or if the RF module 20 needs to have an initial installation of the personalization keys (step 2524). If so, then personalization unit 2302 may download the personalization keys to the RF module database 212 as appropriate (step 2526).

The information (e.g., RF module security keys and identifiers) may be downloaded in an encrypted format and the RF module 20 may store the information in the RF module database 212 as appropriate. The personalization unit 2302 may then create or update a status log cataloging for later use and analysis by the personalization unit 2302 user (step 2528). Upon updating the status log, the personalization process may be terminated.

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. Thus, the preceding detailed description is presented for purposes of illustration only and not of limitation, and the scope of the invention is defined solely by the appended claims and their legal equivalents when properly read in light of the preceding description. For example, the steps recited in any of the method or process claims may be executed in any order and are not limited to the order presented. In addition, although the present description illustrates the invention as embodied in a card, key fob, or cellular phone, the invention is not so limited. That is, the present invention contemplates the incorporation of the inventive technology into a form factor presentable by hand.

What is claimed is:

1. A method for facilitating remote configuration of a radio frequency (RF) module to enable the module to complete financial transactions via RF using a financial transaction account associated with an RF module account issuer, the method comprising:
   a. providing the RF module, which is configured for use with a mobile device comprising a mobile device microprocessor, and configured to be in physical and logical communication with the mobile device microprocessor;
   b. facilitating mutual authentication between an RF module personalization system and the RF module; and
   c. transmitting personalization data from the RF module account issuer to the RF module via the mobile device microprocessor to enable the RF module to complete financial transactions via RF,
   wherein the transmission of the personalization data is performed by the RF module personalization system, and
   wherein the personalization data comprises financial transaction account data and an encryption key, the account data comprising an account number and an account expiration date.

2. A method of claim 1, further comprising providing the RE module with an authentication key prior to providing the RF module to the mobile device.

3. A method of claim 1, further comprising communicating with the RF module via a mobile device account issuer to facilitate mutual authentication between the RF module personalization system and the RF module.

4. A method of claim 1, further comprising communicating with the RF module to supply the personalization data via the mobile device subsequent to communicating with a mobile device account issuer.

5. A method of claim 4, further comprising verifying that the RF module is valid for personalization by the RF module personalization system.

6. A method of claim 1, further comprising providing the personalization data to the RF module via a mobile device account issuer.

7. A method of claim 1, further comprising providing the personalization data to the RF module through direct communication.

8. A method of claim 1, further comprising providing the personalization data to the RF module via a mobile device universal serial bus (USB), the mobile device USB being in communication with the RF module personalization system and with the mobile device microprocessor.

9. A computer-readable storage medium containing a set of instructions for a general purpose computer configured to:
   a. facilitate mutual authentication between an RF module personalization system and an RF module, the RF module is configured for use with a mobile device comprising a mobile device microprocessor, and configured to be in physical and logical communication with the mobile device microprocessor; and
   b. transmit personalization data from the RF module account issuer to the RF module via the mobile device microprocessor to enable the RF module to complete financial transactions via RF,
   wherein the transmission of the personalization data is performed by the RF module personalization system, and
   wherein the personalization data comprises financial transaction account data and an encryption key, the account data comprising an account number and an account expiration date.

10. A system for remotely configuring an RF module radio frequency (RF) module to enable the module to complete financial transactions via RF using a financial transaction account associated with an RF module account issuer, the system comprising:
   a. the RF module, which is configured for use with a mobile device comprising a mobile device microprocessor, and configured to be in physical and logical communication with the mobile device microprocessor, the RF module comprising an RF module device database configured to store personalization data, the mobile device microprocessor configured to provide the personalization data to the RF module database for storage;
   b. a mobile device account issuer communication interface configured to enable communication between a mobile device account issuer and the RF module via the mobile device microprocessor, and
   c. an RF module account issuer system comprising an RF module personalization system, the RF module personalization system being configured to transmit the personalization data from the RF module account issuer system to the RF module,
   wherein the personalization data comprises financial transaction account data and an encryption key, the account data comprising an account number and an account expiration date.

11. A system of claim 10, wherein the personalization data is provided to the RF module via the mobile device account issuer, the mobile device account issuer being configured to communicate with the RF module account issuer for receiving the personalization data.

12. A system of claim 11, wherein the mobile device includes a universal serial bus (USB) connector in communication with the RF module via the mobile device microprocessor for providing the personalization data to the RF module.

13. A system of claim 10, wherein the personalization data is provided to the RF module subsequent to the mobile device communicating to the mobile account issuer that a RF module is to be personalized.

* * * * *

UNITED STATES PATENT AND TRADEMARK OFFICE
CERTIFICATE OF CORRECTION

| | | |
|---|---|---|
| PATENT NO. | : 7,228,155 B2 | Page 1 of 4 |
| APPLICATION NO. | : 10/711970 | |
| DATED | : June 5, 2007 | |
| INVENTOR(S) | : Peter D. Saunders | |

It is certified that error appears in the above-identified patent and that said Letters Patent is hereby corrected as shown below:

ON THE TITLE PAGE [56] REFERENCES CITED:

U.S. Patent Documents, "5,239,654 A  8/1993 Ing Simmons et al." should read
--5,239,654 A  8/1993 Ing-Simmons et al.--; and
Other Publications,
after "Magic Wands'": "BobBrewin" should read --Bob Brewin--,
after "Security for": "relased of" should read --released a--, and
after "TI": "Embarces" should read --Embraces--.

COLUMN 4:

Line 14, "subpart" should read --subpart of--; and
Line 23, "adjacent" should read --adjacent to--.

COLUMN 6:

Line 57, "of" (first occurrence) should read --of a--.

COLUMN 7:

Line 10, "combination" should read --combinations--.

COLUMN 8:

Line 48, "device 102" should read --reader 104--.

COLUMN 9:

Line 15, "POS 112" should read --POS device 110--.

COLUMN 11:

Line 20, "a" should read --an--;
Line 32, "3"x4"" should read --3'x4'--; and
Line 65, "eventually" should read --eventually be--.

UNITED STATES PATENT AND TRADEMARK OFFICE
CERTIFICATE OF CORRECTION

PATENT NO.      : 7,228,155 B2
APPLICATION NO. : 10/711970
DATED           : June 5, 2007
INVENTOR(S)     : Peter D. Saunders It is certified that error appears in the above-identified patent and that said Letters Patent is hereby corrected as shown below:

COLUMN 12:

Lines 46-47, delete "when it is in a rolled position (not shown). The laminate 15 roll".

COLUMN 14:

Line 47, "circuitry 216" should read --circuitry 210--; and
    Line 50, "circuitry 216" should read --circuitry 210--.

COLUMN 15:

Line 11, "reader 104" should read --reader 104.--; and
    Line 18, "ISO/IEC 1443-2" should read --ISO/IEC 14443-2--.

COLUMN 16:

Line 44, "160 standards," should read --ISO standards,--; and
    Line 52, "use" should be deleted.

COLUMN 17:

Line 27, "transpon-" should read --transporter--;
    Line 28, "der" should be deleted; and
    Line 35, "202" should read --502--.

COLUMN 18:

Line 61, "user" should read --user's--.

COLUMN 19:

Line 7, "square" should read --square- --;
    Line 23, delete "logo," (first occurrence); and
    Line 26, "module 20," should read --module 20--.

COLUMN 20:

Line 48, "phone 1402." should read --phone 300--.

UNITED STATES PATENT AND TRADEMARK OFFICE
CERTIFICATE OF CORRECTION

| | | |
|---|---|---|
| PATENT NO. | : 7,228,155 B2 | |
| APPLICATION NO. | : 10/711970 | |
| DATED | : June 5, 2007 | |
| INVENTOR(S) | : Peter D. Saunders | |

It is certified that error appears in the above-identified patent and that said Letters Patent is hereby corrected as shown below:

COLUMN 21:

Line 2, "module 20" should read --module 20,--;
    Line 5, "device 1508" should read --device 102--; and
    Line 21, "an" should read --and--.

COLUMN 23:

Lines 46-47, delete "RF module 20 of FIG. 18 may have similar description as module 300."

COLUMN 24:

Line 21, "is" should read --are--;
    Line 51, delete "and"; and
    Line 52, delete "to" (first occurrence).

COLUMN 25:

Line 1, "(e.g.," should read --(e.g., mobile phone--; and
    Line 63, "decryption" should read --decrypt--.

COLUMN 26:

Line 54, "application" should read --application,--; and
    Line 55, delete "on".

COLUMN 27:

Line 32, "stand alone" should read --stand-alone--;
    Line 42, "does" should read --do--; and
    Line 50, "a" should read --an--.

COLUMN 28:

Line 67, "stand alone" should read --stand-alone--.

UNITED STATES PATENT AND TRADEMARK OFFICE
CERTIFICATE OF CORRECTION

PATENT NO. : 7,228,155 B2
APPLICATION NO. : 10/711970
DATED : June 5, 2007
INVENTOR(S) : Peter D. Saunders It is certified that error appears in the above-identified patent and that said Letters Patent is hereby corrected as shown below:

COLUMN 29:

Line 44, "database 214" should read --database 212--.

COLUMN 31:

Line 5, "controller 314." should read --controller 2108.--; and
Line 7, "encryption decryp-" should read --encryption/decryp- --.

COLUMN 32:

Line 50, delete "device".

COLUMN 34:

Line 5, "a" should read --an--.

Signed and Sealed this

Fourth Day of November, 2008

JON W. DUDAS
*Director of the United States Patent and Trademark Office*